US009936340B2

(12) United States Patent
Meredith et al.

(10) Patent No.: US 9,936,340 B2
(45) Date of Patent: Apr. 3, 2018

(54) WIRELESSLY RECEIVING INFORMATION RELATED TO A MOBILE DEVICE AT WHICH ANOTHER MOBILE DEVICE IS POINTED

(71) Applicant: AT&T Mobility II LLC, Atlanta, GA (US)

(72) Inventors: Sheldon Kent Meredith, Marietta, GA (US); Jeremy Fix, Acworth, GA (US); Christine Thomas, Atlanta, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 127 days.

(21) Appl. No.: 14/080,406

(22) Filed: Nov. 14, 2013

(65) Prior Publication Data
US 2015/0133162 A1 May 14, 2015

(51) Int. Cl.
*H04W 4/02* (2009.01)
*H04W 64/00* (2009.01)

(52) U.S. Cl.
CPC ............. *H04W 4/02* (2013.01); *H04W 64/00* (2013.01)

(58) Field of Classification Search
CPC ....... H04W 4/02; H04W 64/00; H04W 4/021; H04W 4/023; H04W 4/028; H04W 64/006; H04W 4/025; H04W 4/04; H04W 64/003; H04W 4/027; H04W 4/008; H04W 4/18; G01S 5/10; G01S 5/0036; G01S 5/0252; G01S 5/0284; G01S 5/0289; G01S 13/765; G01S 19/14; G01S 1/045

USPC ................... 455/456.1, 456.3, 41.2
See application file for complete search history.

(56) References Cited

U.S. PATENT DOCUMENTS

| 6,452,544 | B1 | 9/2002 | Hakala et al. | |
|---|---|---|---|---|
| 7,648,236 | B1 | 1/2010 | Dobson | |
| 8,184,983 | B1 | 5/2012 | Ho et al. | |
| 8,217,856 | B1 | 7/2012 | Petrou | |
| 8,417,261 | B2 | 4/2013 | Huston | |
| 8,634,848 | B1 * | 1/2014 | Bozarth | H04W 4/026 455/41.2 |
| 2006/0256007 | A1 * | 11/2006 | Rosenberg | G01C 3/18 342/357.4 |
| 2006/0256008 | A1 * | 11/2006 | Rosenberg | G01C 21/20 342/367 |
| 2007/0273583 | A1 * | 11/2007 | Rosenberg | H04W 8/005 342/367 |
| 2009/0289956 | A1 | 11/2009 | Douris et al. | |
| 2010/0130236 | A1 * | 5/2010 | Sivadas | H04W 4/02 455/456.6 |
| 2011/0199917 | A1 * | 8/2011 | Karaoguz | G01S 5/0284 370/252 |
| 2012/0019557 | A1 | 1/2012 | Aronsson et al. | |

(Continued)

*Primary Examiner* — Magdi Elhag
(74) *Attorney, Agent, or Firm* — Amin, Turocy & Watson, LLP

(57) ABSTRACT

Techniques for wirelessly receiving, at a mobile device, information related to another mobile device determined to be in a line of sight relative to the mobile device, are presented. In an aspect, a method includes, determining by a first mobile device, a location of a mobile object determined to be in a line of sight relative to the first mobile device, and wirelessly receiving descriptive information associated with a second mobile device having a location substantially corresponding to the location of the mobile object.

20 Claims, 16 Drawing Sheets

(56) References Cited

U.S. PATENT DOCUMENTS

| | | | |
|---|---|---|---|
| 2012/0072340 A1* | 3/2012 | Amron | G06Q 20/10 |
| | | | 705/39 |
| 2012/0176411 A1 | 7/2012 | Huston | |
| 2012/0206323 A1 | 8/2012 | Osterhout et al. | |
| 2012/0293548 A1 | 11/2012 | Perez et al. | |
| 2013/0021374 A1 | 1/2013 | Miao et al. | |
| 2013/0218950 A1* | 8/2013 | Sakakihara | G06F 15/16 |
| | | | 709/203 |
| 2013/0242262 A1 | 9/2013 | Lewis | |
| 2013/0281110 A1* | 10/2013 | Zelinka | G01S 5/0284 |
| | | | 455/456.1 |
| 2013/0282438 A1* | 10/2013 | Hunter | G01S 1/02 |
| | | | 705/7.32 |
| 2015/0123966 A1* | 5/2015 | Newman | G06T 19/006 |
| | | | 345/419 |

\* cited by examiner

US 9,936,340 B2

WIRELESSLY RECEIVING INFORMATION RELATED TO A MOBILE DEVICE AT WHICH ANOTHER MOBILE DEVICE IS POINTED

TECHNICAL FIELD

This disclosure relates generally to wirelessly receiving, at a mobile device, information related to another mobile device determined to be in a line of sight relative to the mobile device.

BACKGROUND

Social media technologies are increasingly impacting people's lives, especially when combined with mobile devices. People are increasing incentivized to share information about themselves with others and learn information about those individuals around them. When carrying a mobile device that provides access to social media networking applications and online communities, users find themselves frequently updating information throughout the course of the day as they move from place to place. As a result, many users frequently provide others' insight on their day to day activities, essentially living very public lives, and users are equally as interested in learning up to date information about their friends and family.

However, many social networking communities require users to find one another and authorize a courtship prior to allowing one another to share information between them. As a result, information a user may desire to share about herself may not reach certain people she would hope to reach who are not yet connected to her via a social media community. Similarly, if a user cannot identify another person at a social networking community and befriend them, the user will not be able to receive information about that person or provide information to that person.

DETAILED DESCRIPTION

Figure 1:
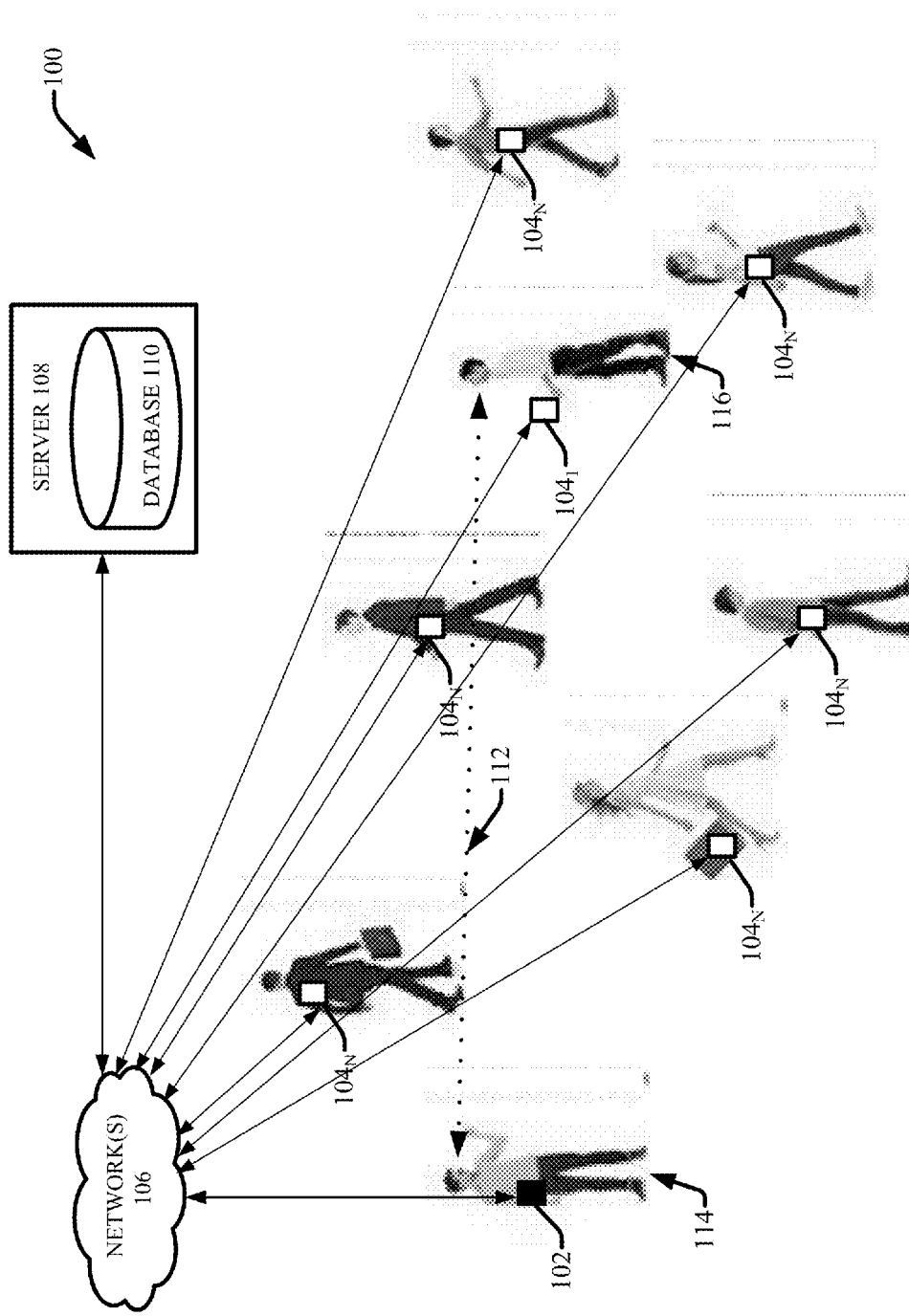
FIG. 1 illustrates an example system that facilitates wirelessly receiving, at a mobile device, information related to another mobile device the mobile device is pointed at, in accordance with various aspects and embodiments described herein.

The various embodiments are described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details. In other instances, well-known structures and components are shown in block diagram form in order to facilitate describing the various embodiments.

By way of introduction, the disclosed subject matter relates generally to wirelessly receiving, at a mobile device, information related to another mobile device the mobile device is pointed at. In an aspect, a mobile device can be associated with descriptive information that is to be published to other devices in response to pointing of the other devices at the mobile devices. Such a mobile device is referred to herein as a readable device. A device that can be pointed at a readable device to receive the descriptive information associated therewith is referred to herein as a reader device. For example, a mobile phone can be associated with information that describes an identity of the owner of the mobile phone and other attributes associated with the owner of the mobile phone. This information can be selected by the owner of the mobile phone and stored at the mobile phone or at a remote server. When another device is pointed at the mobile phone, the information can be wirelessly sent to the other device, either via the remote server or the mobile phone directly, and displayed at the other device. In an aspect, the other device is a wearable optics device. Accordingly, when wearing the wearable optics device, a user can receive information about the mobile phone in response to looking at the mobile device, and display the descriptive information on a display screen of the wearable optics device.

A key aspect of the above scheme involves dynamically determining (e.g., within a few feet) current locations of both the mobile device that is being targeted or pointed at (referred to herein as the target device) and the mobile device that is targeting or pointing at the target device (e.g., the reader device). Using current location data for both the target device and the reader device, the target device can be identified amongst a pool of potential target devices. After the target device is identified, descriptive information associated with the target device can be retrieved, either from a remote database or a the target device directly.

In one embodiment, a first mobile device is provided the performs operations including, determining by the first mobile device, a location of a mobile object determined to be in a line of sight relative to the first mobile device, and wirelessly receiving descriptive information associated with a second mobile device having a location substantially corresponding to the location of the mobile object.

In another embodiment a method includes determining, by a mobile device having a processor, location information representing a current location of the mobile device, updating by the mobile device, the location information in response to movement of the mobile device, and transmitting the location information to a server for association of the location information with descriptive information for the mobile device, and for provision of the descriptive information to another device in response to a request from the other device for information matching the current location of the mobile device.

In yet another embodiment, disclosed is a tangible computer readable medium comprising computer executable instructions that, in response to execution, cause a system to perform various operations. The operations include, associating respective descriptive information with mobile devices, receiving respective location information from the mobile devices representing current locations of the mobile devices, receiving a request from a device for information associated with a mobile device at a location of a target object, identifying one of the mobile devices associated with the location of the target object using the location information, and sending, to the device, descriptive information associated with the mobile device at the location of the target object.

With reference to the drawings, FIG. 1 is an example system 100 that facilitates wirelessly receiving, at a mobile device, information related to another mobile device the mobile device is pointed at, in accordance with various aspects and embodiments described herein. Aspects of systems, apparatuses or processes explained in this disclosure can constitute machine-executable components embodied within machine(s), e.g., embodied in one or more computer readable mediums (or media) associated with one or more machines. Such components, when executed by the one or more machines, e.g., computer(s), computing device(s), virtual machine(s), etc. can cause the machine(s) to perform the operations described.

System 100 includes a plurality of people/users dispersed within a geographical area. The size of the geographical area can vary. In an aspect, the geographical area is of a size such that a least some of the respective users are within visible focal range of one another. The respective users are associated with mobile devices 102 or 104 that are configured as reader devices and/or readable devices, as defined herein. The mobile devices (e.g., devices 102 and 104) can vary so long as they can be attached to or carried by a user (or other mobile entity, such as an animal, a car, an airplane, etc.), and so long as current locations of the respective mobile devices can be dynamically determined. For example, the mobile devices can include handheld devices (e.g., cellular phones, cameras), wearable devices (e.g., integrated in clothing, glasses, watches, jewelry, etc.) or implantable devices (e.g., implantable medical device (IMD)), whose locations can be determined internally (e.g., by the device) or externally by an external device.

System 100 further includes one or more networks 106 and server 108. Mobile devices 102 and 104 are configured to wirelessly communicate with server 108 via the one or more networks 106. The one or more networks 106 can include but are not limited to a cellular network, a wide area network (WAD, e.g., the Internet), a local area network (LAN), or a personal area network (PAN). For example, mobile devices 102 and 104 can communicate with server 108 (and vice versa) using virtually any desired wireless technology, including, for example, cellular, WAN, wireless fidelity (Wi-Fi), Wi-Max, WLAN, etc. In an aspect, one or more components or devices of system 100 are configured to interact via disparate networks. For example, a first mobile readable device 104 can communicate with server 108 via a cellular network while a second mobile readable device 104 can communicate with server 108 via another type of wireless network, such as the Internet.

In an aspect, server 108 is part of or otherwise associated with a cellular network. According to this aspect, server 108 can be accessed by mobile devices 104 and/or 102 via the cellular network, and vice versa. The cellular network can employ various cellular technologies. For example, the cellular network can operate in accordance with a universal mobile telecommunications system (UMTS), long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), orthogonal frequency division multiple access (OFDMA), single-carrier FDMA (SC-FDMA), 3rd and 4th generation partnership project (3GPP and 4GPP), etc.

In an aspect, mobile devices 104 (e.g., $1041_{1-N}$, where N respectively represents a number 2, 3, 4 . . . etc.) are readable devices and mobile device 102 is a reader device. Server 108 is configured to store (e.g., in database 110), determine or otherwise access, information associating respective readable devices 104 with descriptive information intended for publishing to others and current locations of the respective readable devices 104. In an aspect, the descriptive information is sent from the respective readable devices 104 to server 108 via one or more networks. For example, a user of a readable device 104 can select information he or she would like to make available to others using an application provided on his or her mobile device 104 and send the information to server 108. In another aspect, a user of a mobile readable device 104 can access a network based platform associated with server 108 (e.g., a website) via another device and select descriptive information to associate with mobile device 104 for publishing to others. Still in yet another aspect, descriptive information associated with a readable mobile device can be determined or inferred by server 108.

In an aspect, readable devices 104 are configured to determine their current locations and send information identifying their current locations to server 108 via one or more networks 106. According to this aspect, readable devices 104 can be configured to routinely or continuously determine their current locations and send information identifying their currently locations to server 108. For example, readable devices 104 can determine and send information identifying their current locations every X milliseconds (ms) (e.g., every 100 ms, every 200 ms, etc.). In another example, readable devices 104 can determine and send information identifying their current locations in response to movement of the readable devices 104, respectively.

In another aspect, server 108 can dynamically determine locations of mobile readable devices 104. According to this aspect, server 108 can employ various mobile device positioning mechanisms to determine current locations of mobile devices 104 based radio measurements associated with signals sent by and/or received from the respective mobile devices in association with operating in a cellular network. Still in yet another aspect, server 108 can receive information regarding current locations of mobile devices 104 from another device or system (not shown) configured to determine current locations of mobile devices. For example, server 108 can receive location information identifying current locations of respective mobile devices 104 from another local device configured to determine locations of mobile devices 104 using a sensor network.

System 100 is described wherein a single user (e.g., user 114) is associated with a reader device 102 while the remaining users are associated with readable devices 104, merely for exemplary purposes. It should be appreciated that any number M of users can be accommodated by system 100 and poses reader devices and/or readable devices. Further, as described infra, a reader device can be configured as both a reader device and a readable device, and vice versa.

With system 100, as user 114 moves about with his reader device 102, user 114 can look at, focus upon, or otherwise target, other users or objects that are associated with mobile readable devices 104 and receive information about the respective users or objects that has been associated with the respective mobile readable devices 104. In particular, user 114 can aim or point his reader device 102 at another user or object (referred to herein as the target object) possessing a mobile readable device 104. For example, as shown in system 100, user 114 is targeting user 116, as indicated by line 112. In response to aiming or pointing of reader device 102 at a target object (e.g., user 116), reader device 102 can determine a position of the target object. The reader device 102 can then send a request to server 108 asking for descriptive associated with the target object. The request can include the location of the target object or information that can be employed by server 108 to determine a location of the target object.

Upon receipt of the request, server 108 can identify a mobile readable device 104 at a location closest to the location of the target object using information stored at or otherwise accessible to server 108 (e.g., using location information identifying current locations of respective readable mobile devices 104 sent from the respective readable mobile devices 104 to server 108). For example, server 108 can identify mobile device 104$_1$ as the mobile device associated with the target object, user 116. The server 108 can then respond to the request and send descriptive information associated with mobile readable device 104$_1$ to reader device 102. Upon receipt of the descriptive information, reader device 102 can display or present the information to user 114 (e.g., via a display screen, as audio via a speaker, etc.). The information can include information about the other user that the other user has authorized to be published to others. For example, the information can include information describing attributes of the other user or an identity of the other user (e.g., the user's name, the user's occupation, the user's age, the user's date of birth, the user's marital status, the user political affiliation, etc.).

In an aspect, in order to target another object or user, reader device 102 can be pointed at an object or user who is carrying or otherwise possessing a readable device 104. For example, reader device 102 can be configured as a handheld device that can be aimed or pointed at other objects and determine a position of an object at which it is pointed. In another example, reader device 102 can include a wearable optics device that can be worn over an eye of a user and determine a position of an object determined to be in a line of sight relative to the wearable optics device.

In an aspect, reader device 102 can determine a position or location of a target object, (e.g., an object at which reader device 102 is pointed and or determined to be in a line of sight of user 114, relative to reader device 102) using vector computation. For example, reader device 102 can determine its location (e.g., using a precise locating mechanism as described herein) and its azimuthal orientation (e.g., as determined using an internal compass). Reader device 102 can further determine its range or distance to the target object using optical ranging mechanisms (e.g., ranging mechanisms associated with autofocus cameras). The reader device 102 can then determine a location of the target object (e.g., a latitude and longitude) using a vector computation whereby a base of the computed vector is the location of the reader device 102, the vector orientation is the orientation of the reader device, and the length of the vector is the distance to the target object. The computed vector can be used by the reader device 102 and/or server 108 to determine a position of the target object with respect to the reader device 102.

Figure 2:
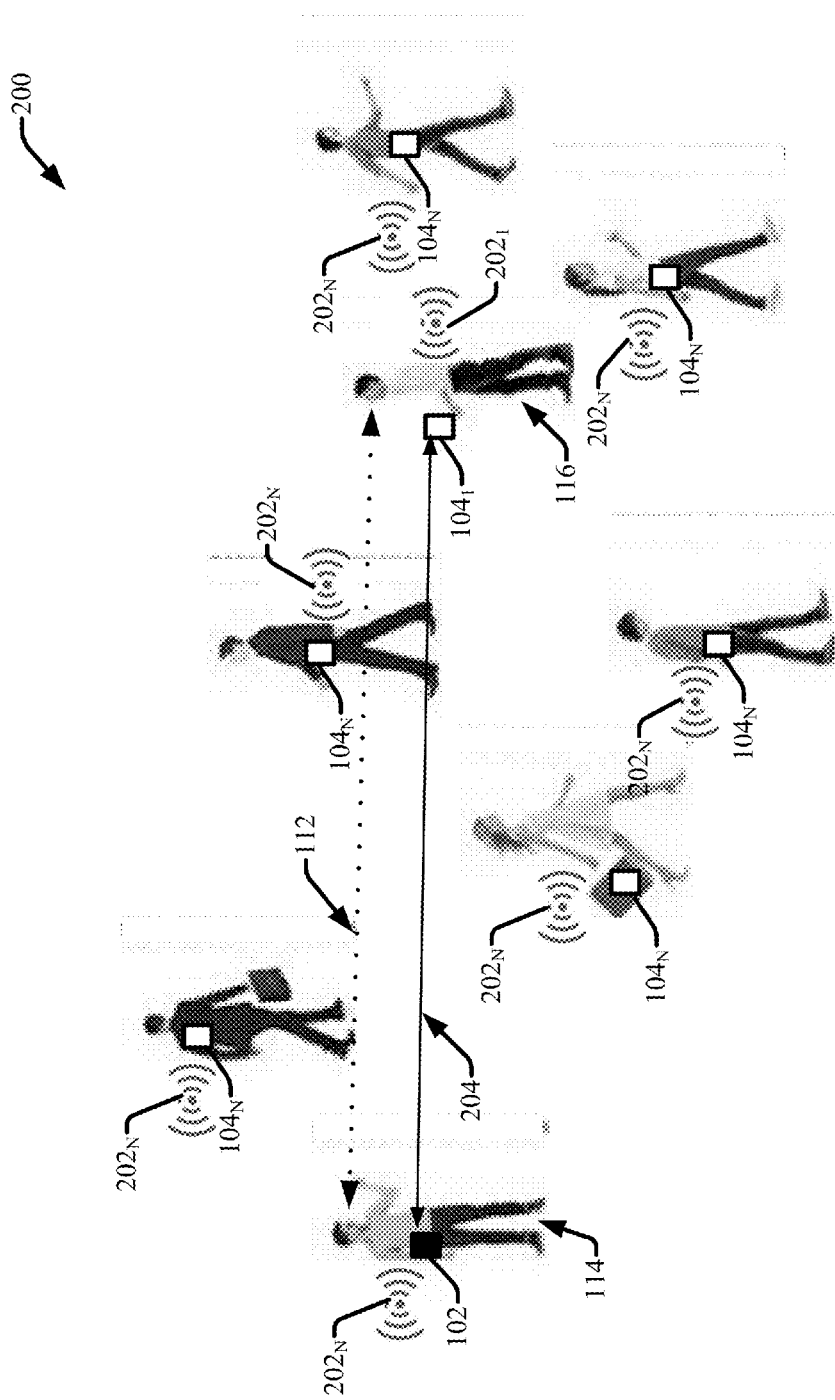
FIG. 2 illustrates another example system that facilitates wirelessly receiving, at a mobile device, information related to another mobile device the mobile device is pointed at, in accordance with various aspects and embodiments described herein.

FIG. 2 is another example system 200 that facilitates wirelessly receiving, at a mobile device, information related to another mobile device the mobile device is pointed at, in accordance with various aspects and embodiments described herein. System 200 includes same or similar features presented in system 100. However, rather than employing a server 108 to facilitate identifying a mobile device targeted by reader device 102, as described with respect to system 100, in system 200, a reader device 102 can identify a target mobile device, and vice versa, without employing a server 108. Repetitive description of like elements employed in respective embodiments of systems, processes and devices described herein are omitted for sake of brevity.

In one embodiment, mobile readable devices 104 can regularly (e.g., continuously, routinely, in response to movement, etc.) determine their current locations as described with respect to system 100. However, rather than sending information identifying their current locations to server 108, the mobile readable devices 104 can wirelessly transmit or broadcast the information identifying their current locations to nearby devices (e.g., devices within optical range of the respective devices). For example, readable mobile devices 104 (and reader device 102) can activate radio transmitters (or transceivers) provided thereon and emit radio frequency (RF) signals or beacons (as represented by respective activation signals 202$_{1-N}$, where N is a number 2, 3, 4 . . . etc.) with information identifying their current locations. In an aspect, in addition, to location information, the mobile readable devices 104 can also broadcast descriptive information respectively associated therewith that has been selected for publishing to other devices.

After a reader device 102 has determined a location of a target object (e.g., using vector computation as described infra), the reader device 102 can listen for information broadcasted from surrounding readable mobile devices 104. Reader device 102 can analyze received information broadcasted from surrounding readable devices 104 identifying their respective locations and identify one of the readable device associated with a location closest to the location of the target object. For example, as depicted in system 200, reader device 102 has targeted user 116. Accordingly, reader device 102 can identify mobile readable device $104_1$ as the reader device having the closest location to the location of target object, user 116, using the location information broadcasted from the respective mobile readable devices 104.

In an aspect, where the readable devices 104 also broadcast their respective descriptive information, reader device 102 can choose to display the broadcasted descriptive information from the readable device having the closest location to the computed location of the target object, readable device $104_1$. In another aspect, where the readable devices 104 do not broadcast their descriptive information, after reader device 102 has identified the readable device $104_1$ having the location closest to the location of the target object, reader device 102 can send a request to the targeted readable device $104_1$ for its descriptive information. For example, as indicated by line 204, reader device 102 can communicate with targeted mobile readable device $104_1$ and ask the mobile readable device $104_1$ for its descriptive information. The targeted readable device can then respond (or choose not to respond) to the request and send its descriptive information to the reader device 102.

In another embodiment, reader device 102 can determine a location of a target object (e.g., using vector computation as described infra). After reader device 102 has determined a location of a target object, reader device 102 can transmit a request signal or beacon to nearby mobile readable devices with information identifying the location of the target object and requesting a device associated with the location of the target object to provide its descriptive information. According to this embodiment, mobile readable devices 104 can periodically or continuously activate RF receivers (or transceivers) provided thereon to listen for such requests from reader device 102. In response to receipt of the request, the mobile readable devices 104 can respectively determine whether they are the device having the location of the target object. For example, the mobile readable devices 104 can determine their current locations at the time of the request or employ previously determined location information where their locations have not changed from a previous determination. The mobile readable devices 104 can apply a maximum deviation whereby the devices will consider themselves the device closest to the location of the target object if their current location is within Y feet of the location of the target object (e.g., where Y is about three feet).

After a mobile readable device 104 has identified itself as the device associated with the target object, the mobile readable device 104 can respond to the request and provide reader device 102 with its descriptive information. For example, in accordance with system 200, targeted mobile readable device $104_1$ can receive a request from reader device 102 with information identifying a location of a target object. Mobile readable device $104_1$ can then determine that its current location is within three feet of the location of the target object and respond to the reader device's request with the descriptive information associated therewith.

In accordance with the various embodiments described with respect to system 200, descriptive information associated with respective mobile readable device 104 can be stored at or otherwise accessed and provided by the mobile readable devices themselves (e.g. as opposed to the server 108 described in accordance with system 100).

Techniques for determining locations of respective devices 102 and 104 in accordance with aspects and embodiments described herein can vary and can include device based locating mechanisms, network based locating mechanisms, subscriber identity module (SIM) based locating mechanisms, or a combination thereof. However, locating mechanisms that facilitate determining an estimated location of a mobile device 102 or 104 to within about three feet of an actual location of the mobile device, are preferred. In particular, in accordance with aspects of systems 100 and 200, a target mobile device (e.g., mobile device $104_1$) is identified among a pool of readable mobile devices 104 based in part on its current (or substantially current) location. After the target device is identified, information associated with the target device can be provided to the reader device 102, either from the server 108 or from the target device (e.g., mobile device $104_1$). Similarly, a reader device 102 can facilitate identifying a target device using a computation based on a vector that initiates from the current location of the reader device 102. Thus it should be appreciated that the greater accuracy to which actual locations of a reader device and a target device can be determined, the greater accuracy at which an identity of a target device can be determined, and the greater the accuracy at which information associated with the correct readable device (e.g., the one being targeted) can be provided to the reader device.

In an aspect, a mobile device 102 and/or 104 can determine its location using a global positioning system (GPS), terrestrial GPS or indoor location techniques using high bandwidth Wi-Fi technologies. In another aspect, a mobile device 102 and/or 104 can determine its location using a sensor configured to read RF identification tags or a media access control address associated with a device or component near the device that indicates a current location of the device. Still in yet other aspect, a mobile device 102 and/or 104 can facilitate generation of information that can be employed by the mobile device 102 and/or an external device (e.g. server 108 and/or another local locating device) to determine a location of the mobile device using assisted GPS (ALPS), time based locating methods (e.g., time difference of arrival TDOA), signal strength based locating methods, triangulation, multilateration, angulation techniques, location patterning techniques, or any other mobile device tracking methods.

Systems 100 and 200 can facilitate a myriad applications. In an aspect, systems 100 and 200 can enable persons who do not know each other find specific people of interest to them amongst a plurality of people. For example, in a crowd of people, respective people can have carry a smartphone or other device type of device configured as a readable device which is associated with information specific to them. This information could be identification information, marital status, group membership, age, type of clothing they are wearing, how they are feeling (talkative or "do not disturb"), whether it is their birthday, or any other conceivable information a user would like to advertise about himself to others. Similarly, respective people can poses reader devices configured to target readable devices and receive the information associated therewith. In an aspect, a user's smartphone or the type of device could be configured as a both reader device and a readable device. According to this example, members of a tour group could easily find other members, a passenger could find his assigned limo driver at an airport, or a single man could easily identify single women at a social gathering, simply by directing their respective reader devices at different people in the crowd and receiving information associated with those people via their readable devices they possesses. Similarly, a clothing designer could walk around wearing her new collection and publish information letting others know what she is wearing, how much it costs, and wear to purchase it.

Aspects of systems 100 and 200 could also be applied to other types of moving objects aside from people. For example, readable devices can be attached to other moving objects, such as cars, airplanes, trains, boats, bicycles, animals, etc, and display information associated with the moving object they are attached to in response to targeting and reading of the respective readable devices by a reader device. For example a taxi cab could employ a readable device to advertise information regarding its availability, its route and its rate. In another example, a business vehicle could employ a readable device to publish information regarding the businesses associated with the vehicle, or a user could attach a readable device to their vehicle that advertises that the vehicle is for sale and associated sale information. Still in yet another example, a readable device could be attached to a dog collar to facilitate identifying the dog and the owner of the dog in the event the dog becomes lost.

Figure 3:
FIG. 3 demonstrates an example reader device with information displayed thereon in response to targeting of a readable device, in accordance with various aspect and embodiments described herein.

FIG. 3 demonstrates an example reader device 302 with information displayed thereon in response to targeting of a readable device $104_1$ in accordance with aspect and embodiments described herein. Reader device 302 includes same or similar features as reader device 102. Repetitive description of like elements employed in respective embodiments of systems, processes and devices described herein are omitted for sake of brevity.

In an aspect, reader device 302 is a mobile phone, such as a smartphone. According to this aspect, reader device 302 can target another object or person associated with a readable device in response to aiming or pointing of reader device 102 at the target object and/or readable device associated with the target object. In an aspect, reader device 102 is equipped with a camera. According to this aspect, the camera of the reader device 102 can facilitate aiming and focusing upon a target object in association with determining a location of the target object.

In response to targeting an object or person possessing a readable device, information associated with the readable device can be displayed on a display screen of the reader device. Call out box 300 presents an enlarged view of reader device 302 in response to targeting user 116 and/or readable device $104_1$. As seen in call out box 300, reader device 102 can generate an interface that displays information associated with readable device $104_1$. For example, the information selected by user 116 to publish in association with his readable device includes his picture, his name, his occupation, his age, his marital status, his phone number, and his email address.

Figure 4:
FIG. 4 demonstrates another example reader device with information displayed thereon in response to targeting of a readable device, in accordance with various aspect and embodiments described herein.

FIG. 4 demonstrates another example reader device 402 with information displayed thereon in response to targeting of readable device $104_1$ in accordance with aspect and embodiments described herein. Reader device 402 includes same or similar features as reader devices 302 and 102, and vice versa. Repetitive description of like elements employed in respective embodiments of systems, processes and devices described herein are omitted for sake of brevity.

In an aspect, reader device 402 is a wearable optics device configured to be worn by a user. According to this aspect, reader device 402 can target another object or person associated with a readable device in response to looking at the target object and/or readable device associated with the target object when reader device 402 is worn by a user. Similar to reader device 302, in response to targeting an object or person possessing a readable device, information associated with the readable device can be displayed on a display screen of the reader device 402. Call out box 400 presents an enlarged view of reader device 402 in response to targeting user 116 and/or readable device $104_1$. As seen in call out box 400, reader device 402 can generate an interface that displays information associated with readable device $104_1$. For example, the information selected by user 116 to publish in association with his readable device includes his picture, his occupation, his age, and his marital status. In an aspect, the amount and configuration of information displayed by a reader device is modified as a function of a size of a display screen of the reader device and functionality of the reader device. For example, where a reader device does not include a display screen, information associated with a targeted readable device can be provided to a user of the reader device in audible form via a speaker of the reader device.

Figure 5:
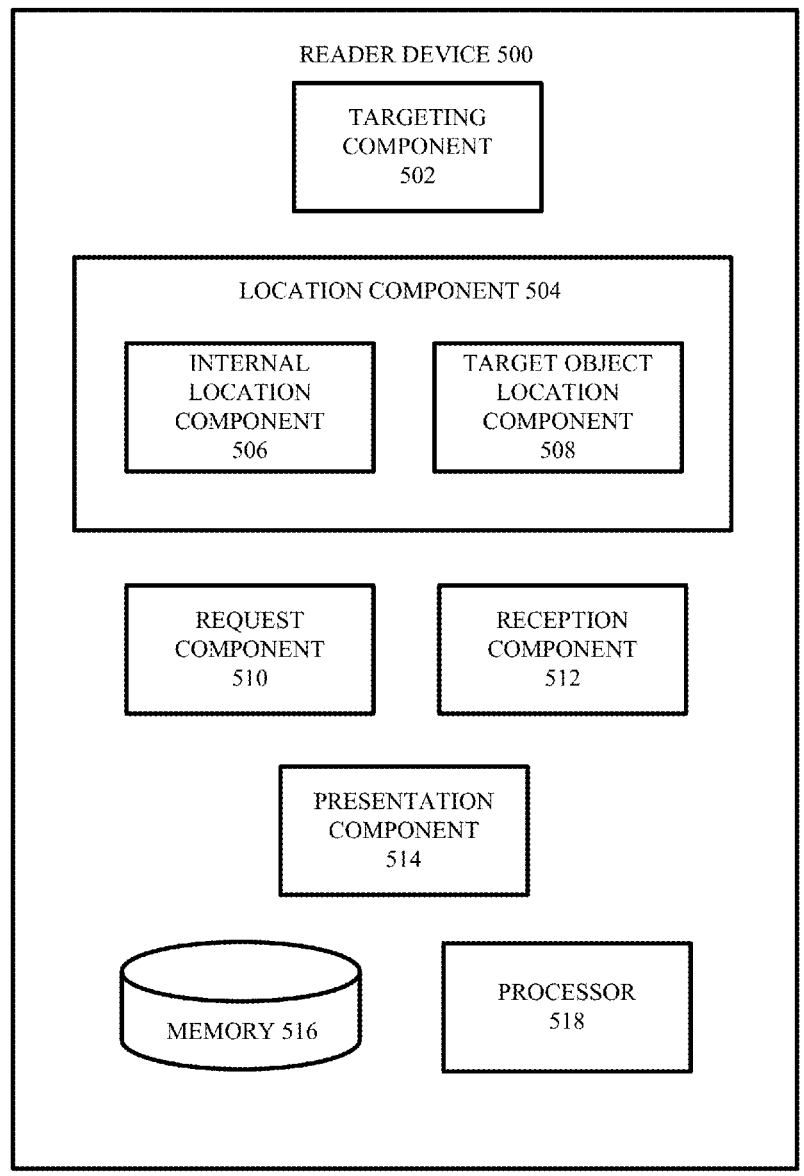
FIG. 5 presents an example reader device in accordance with various aspects and embodiments described herein.

Turning now to FIG. 5 presented is an example reader device 500 in accordance with aspects and embodiments described herein. Reader device 500 can include same or similar features as other reader devices previously described. Repetitive description of like elements employed in respective embodiments of systems, processes and devices described herein are omitted for sake of brevity.

Reader device 500 is configured to interact with a server (e.g., server 108) via a network (e.g., one or more networks 106) to receive information associated with targeted readable device. Reader device 500 includes targeting component 502, location component 504, request component 510, reception component 512 and presentation component 514. Reader device 500 further includes memory 516 for storing computer executable components and instructions and processor 518 to facilitate operation of the instructions (e.g., computer executable components and instructions) by reader device 500. In an aspect reader device 500 is a mobile device, such as a smartphone, a camera, a wearable optics device, or a tablet personal computer. In another aspect, reader device can include a stationary device.

Targeting component 502 is configured to facilitate targeting mobile objects of interest for which a user of reader device 500 would like to receive descriptive information regarding. In an aspect, targeting component 502 can determine or infer when reader device is pointed or aimed at an object or person and capture or identify the position of the object or person targeted. For example, where reader device 500 includes an optical focusing device (e.g., a wearable optics device or a cameral) targeting component 502 can determine when an object or person is located within a line of sight relative to reader device 500 and/or when reader device is focused upon an object or person. In another aspect, targeting component can emit signals of various wavelengths, (e.g., RF signals, visible light signals, non-visible light signals, etc.) whose transmittance prosperities can facilitate determining a position (e.g., as a function of amount of light reflected, angle of arrival of a reflected signal, etc.) of an object at which reader device 500 is pointed at. According to this aspect, reader device can employ capabilities similar to those employed in a laser gun.

In an aspect, targeting component 502 can receive user input to facilitate confirming that a particular object or person is being targeted and/or initializing targeting capabilities of reader device. For example, where targeting component is continuously initialized, targeting component may identify an object at which reader device 500 happens to be pointed at or focused upon. However the user of reader device may not necessarily desire to receive information regarding the object. Thus in an aspect, targeting component 502 can receive selection input indicating selection of a target object. For example, in response to targeting of an object, targeting component 502 can ask the user (e.g., via a visual or audible prompt) if he or she would like information regarding the targeted object. In another example, a user can press a selection button or widget associated with reader device 500 to select a targeted person or object. In another example, a user can provide verbal confirmation that a specific object has been targeted. The verbal confirmation can be captured by a microphone associated with reader device and processed by targeting component 502.

Location component 504 includes internal location component 506 configured to determine a location of reader device 500 and target object location component 508 configured to determine a location of a target object, in accordance with aspects previously described. For example, internal location component 506 can employ various locating methods to determine a current location or substantially current location of reader device 500, including but not limited to, GPS, terrestrial GPS, indoor location techniques using high bandwidth Wi-Fi technologies, or identification and correlation of known locations of RF identifications tags or media access control addresses. In an aspect, internal location component 506 is configured to determine a current location of reader device 500 in response to targeting of a target object or device by targeting component 502.

Target object location component 508 is configured to determine a current location or substantially current location of a mobile target object or person with respect to reader device 500. In an aspect, target object location component 508 can determine a position or location of a target object, (e.g., an object at which reader device 500 is pointed and or determined to be in a line of sight relative to reader device 500 via targeting component) using a vector computation. For example, target object location component 508 can determine an azimuthal orientation of reader device 500 (e.g., as determined using an internal compass and/or internal orientation sensors of reader device 500) and its range or distance to the target object using various ranging mechanisms (e.g., ranging mechanisms associated with autofocus cameras, RF or light signal reflection, etc.). Target object location component 508 can also determine an elevation of reader device 500 with respect to a baseline (e.g., ground level). Target object location component 508 can then determine a location of the target object (e.g., a latitude, longitude and/or altitude) using a vector computation whereby a base of the computed vector is the location of the reader device 500 (as determined via internal location component 506), the vector orientation is the orientation of the reader device, and the length of the vector is the distance to the target object.

In an aspect, request component 510 is configured to send a request for information regarding a targeted object or person to an external server (e.g., server 108) via a network (e.g., networks 106). In an aspect, the request can include information identifying a location of the targeted object as determined by target object location component 508. In another aspect, the request can include information indicating a distance between reader device 500 and the target object and an azimuthal orientation of reader device 500. According to this aspect, reader device 500 does not need to determine its current location and/or determine a location of the target object. On the contrary, the server can determine a location of reader device 500 (e.g., using network based mobile device locating mechanisms). The server can also compute or determine a location of the target object using the provided distance between the reader device 500 and the target object, the azimuthal orientation of the reader device, and the location of the reader device (e.g., as determined by the server).

Upon receipt of a request, the server can examine stored information (e.g., provided in database 110), or information otherwise accessible to the server, indicating current or substantially current locations of readable devices and descriptive information respectively associated with the readable devices. The server can then identify one of the readable devices associated with a current location closest to the location of the target object and return the descriptive information associated with the one of the readable devices to the reader device. In an aspect, the server can apply a threshold maximum distance requirement, whereby a current location of a readable device must be within X feet (e.g., about five feet) of the location of the target object in order to consider the readable device a match. According to this aspect, if a readable device is not found which meets the threshold maximum distance requirement, the server can respond to the reader device's request with an indication that no information or result was found.

In an aspect, the request can include various descriptors providing details regarding the type of information requested for a target object. According to this aspect, request component 510 can receive user input regarding specific information he or she would like to receive regarding a target object. For instance, a readable device can be associated with a variety of information regarding the object it is associated with. Rather than receiving all of the information associated with the readable device, a request can specify what information is desired. For example, a request could include a category of information desired (e.g., "Contact Information," "Identification information,") or a specific question regarding the target object (e.g., "Is she single?, "Can I see a close up picture of the person?," etc.). According to this aspect, the server can analyze a request and provide filtered responses based on the parameters defined in the request. If the serve cannot identify the particular information request, the server can respond to the request with an indication that the information could not be provided or determined.

In an aspect, reception component 512 is configured to receive responses to requests for information regarding a target object from an external server. Presentation component 514 is configured to present or otherwise provide information received at reader device 500 regarding a target object or person, to a user of reader device 500. In an aspect, presentation component 514 can generate a user interface and display information regarding the target object or person via a display screen. In another aspect, presentation component 514 can generate an audio response and verbalize the information regarding the target object via a speaker associated with reader device 500. Presentation component 514 can further adapt the manner in which information is rendered to a user and the amount of information rendered to a user based in part on display and/or audio capabilities of reader device 500.

Figure 6:
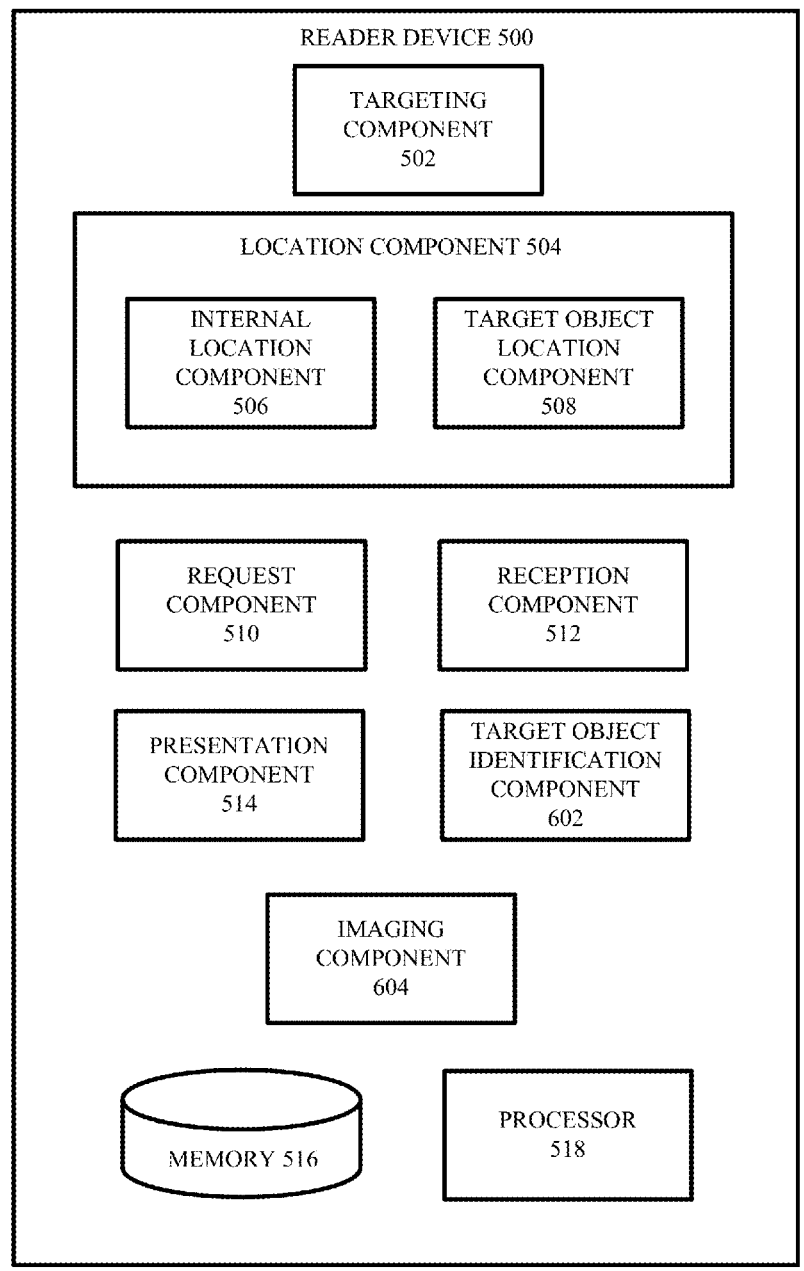
FIG. 6 presents another example reader device in accordance with various aspects and embodiments described herein.

FIG. 6 presents another example reader device 600 in accordance with aspects and embodiments described herein. Reader device 600 can include same or similar features as other reader devices previously described. Unlike reader device 500, reader device 600 is configured to receive information associated with a targeted readable device directly (e.g., without interaction with an external server). According to this embodiment, one or more components associated with reader device 500 that are also included with reader device 600 can be removed and/or have different functionality. Repetitive description of like elements employed in respective embodiments of systems, processes and devices described herein are omitted for sake of brevity.

In addition to targeting component 502, location component 504, request component 510, reception component 512 and presentation component 514, reader device 600 includes target object identification component 602, and imaging component 604.

In an aspect, reader device 600 is configured to receive, via reception component 512, signals transmitted (e.g., as beacons) from nearby readable device indicating their respective locations. For example, mobile readable devices can regularly (e.g., continuously, routinely, in response to movement, etc.) determine their current locations (using various device based locating mechanisms) and wirelessly transmit or broadcast information identifying their current locations to nearby reader devices. In an aspect, in addition to location information, the mobile readable devices can also broadcast descriptive information respectively associated therewith that has been selected for publishing to other devices.

According to this aspect, in response to targeting an object and determining its location (e.g., via targeting component 502 and target object location component 508), reception component 512 can activate a receiver or transceiver of reader device 600 and listen for signals emitted from nearby readable devices indicating the respective locations of the readable devices. Target object identification component 602 can then be employed to analyze received information broadcasted from surrounding readable device identifying their respective locations and to identify one of the readable devices associated with a location closest to the location of the target object. In an aspect, target object identification component 602 can apply a threshold maximum distance requirement, whereby a current location of a readable device must be within X feet (e.g., about five feet) of the location of the target object in order to consider the readable device a match. According to this aspect, if a readable device is not found which meets the threshold maximum distance requirement, the target object identification component 602 can indicate that no information or result was found.

In an aspect, where the readable devices also broadcast their respective descriptive information, presentation component 514 can choose to display the broadcasted descriptive information from the readable device having the closest location (and meeting a maximum distance threshold) to the computed location of the target object. In another aspect, where the readable devices do not broadcast their descriptive information, after target object identification component has identified the readable device having the location closest to the location of the target object, reader device 600 can employ request component 510 to send a request to the targeted readable device for its descriptive information. The request can include information identifying the location of the target object. The request can also include parameters defining specifically requested information. The targeted readable device can then respond (or choose not to respond) to the request and send the requested descriptive information to the reader device 600.

In another aspect, after target object location component 508 has determined a location of a target object, reader device 600 can employ request component 510 to transmit a request signal or beacon to nearby mobile readable devices with information identifying the location of the target object and requesting a device associated with the location of the target object to provide descriptive information (e.g., descriptive information in general or a particular requested subset of the descriptive information). According to this embodiment, the nearby mobile readable devices can periodically or continuously activate RF receivers (or transceivers) provided thereon to listen for such requests from reader device 600. In response to receipt of the request, the mobile readable devices can respectively determine whether they are the device having the location of the target object. For example, the mobile readable devices can determine their current locations at the time of the request or employ previously determined location information where their locations have not changed from a previous determination. The mobile readable devices can also apply a maximum deviation threshold whereby the devices will consider themselves the device closest to the location of the target object if their current location is within Y feet of the location of the target object (e.g., where Y is about three feet).

After a mobile readable device has identified itself as the device associated with the target object, the mobile readable device can respond to the request and provide (or not provide) reader device 600 with the requested descriptive information for presentation at reader device 600 by presentation component 514. In accordance with the various aspects described with respect to reader device 600, descriptive information associated with respective mobile readable devices can be stored at or otherwise accessed and provided by the mobile readable devices themselves (e.g. as opposed to the server 108 described in accordance with system 100).

Imaging component 604 is configured to employ camera or other image detection and/or capture mechanisms to determine or infer image properties associated with a target object. For example, imaging component 604 can capture an image of a target object and employ facial recognition software (or the like) to determine or infer physical facial feature of the target object. Imaging component 604 could also determine or infer other physical features of a target objects, such as size, height, age, ethnicity, skin color, hair color, eye color, gender, clothing, etc. This physical characteristic information can be transmitted by reader device 600 to other readable devices in association with information identifying a location of a target object. A receiving readable device can then employ this physical characteristic information to facilitate determining whether it is in fact the correct readable device associated with the targeted object.

Figure 7:
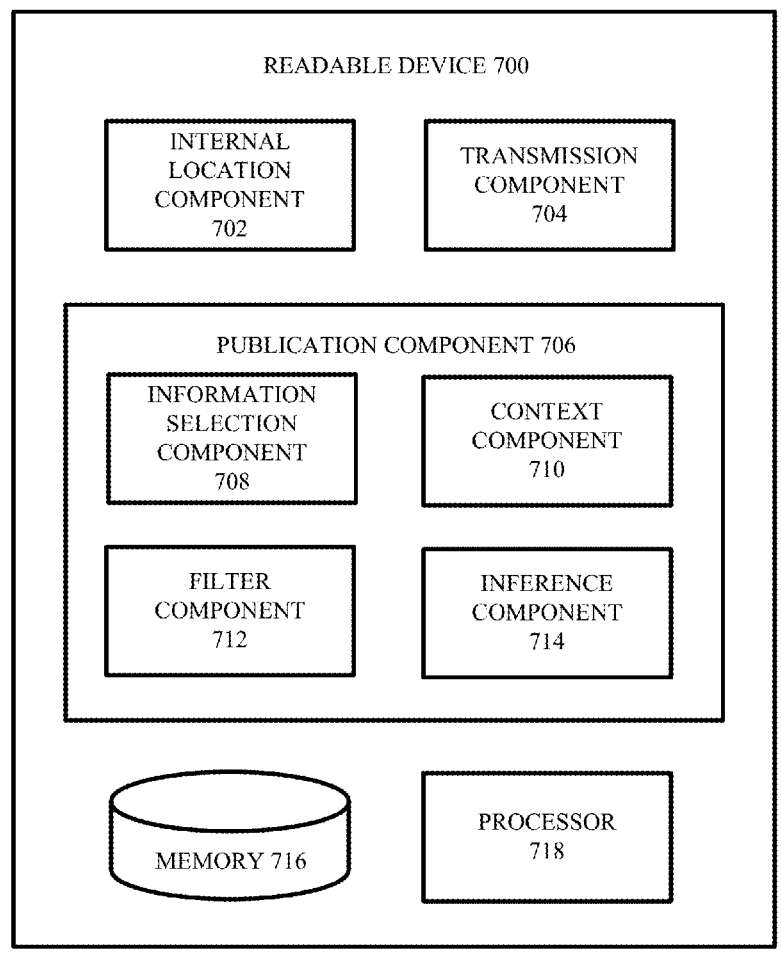
FIG. 7 presents an example readable device in accordance with various aspects and embodiments described herein.

FIG. 7 presents an example readable device 700 in accordance with aspects and embodiments described herein. Readable device 700 can include same or similar features as other readable devices previously described. Repetitive description of like elements employed in respective embodiments of systems, processes and devices described herein are omitted for sake of brevity.

Readable device 700 can include a mobile device configured to determine or infer its location using one or more device based locating mechanisms (e.g., those device based locating mechanisms discussed herein and available in the future). For example, readable device 700 can include, a phone, a smartphone, a camera, a wearable optics device, a tablet personal computer, or any other type of mobile computing device that can be attached to or integrated within a mobile object, such as a person or a vehicle. In an aspect, readable device 700 is configured to interact with a server (e.g., server 108) via a network (e.g., one or more networks 106) and provide the server updated location information, indicating current or substantially current locations of readable device 700, for association of the location information with descriptive information for the readable device 700, and for provision of the descriptive information to another device in response to a request from the other device for information matching the current location of the readable device. In an aspect, readable device 700 can also provide the server with the descriptive information to associate with the readable device.

Readable device 700 can include internal location component 702, transmission component 704, and publication component 706. Readable device 700 further includes memory 716 for storing computer executable components and instructions and processor 718 to facilitate operation of the instructions (e.g., computer executable components and instructions) by readable device 700.

Internal location component 702 is configured to determine current or substantially current locations of readable device 700 using one or more device based locating mechanisms (e.g., those device based locating mechanisms discussed herein and available in the future). In an aspect, internal location component 702 can continuously or routinely determine and update location information for readable device. For example, internal location component 702 can determine a location of readable device every 10 ms, every 100 ms, every 200 ms, etc. In another aspect, internal location component 702 can be configured to determine a location of readable device 700 in response to movement or a change in location of readable device. In another aspect, the rate at which internal location component 702 updates or recalculates a current location of readable device 700 can be a function of the rate or speed of movement of the readable device 700.

In an aspect, transmission component 704 is configured to transmit information identifying a current or substantially current location of readable device 700 to an external server (e.g., server 108), in response to a location determination by internal location component 702, for association of the location information with descriptive information for the readable device 700, and for provision of the descriptive information to another device in response to a request from the other device for information matching the current location of the readable device. When transmitting location information for readable device 700 to the server, transmission component 704 can also transmit information that can be employ by the server to uniquely identify readable device (e.g., a phone number or other unique device identifier).

In an aspect, publication component 706 is configured to identify descriptive information associated with readable device 700 and/or a user of readable device 700 for provision to another device by the server in response to a request from the other device for information matching the current location of the readable device. In an aspect, the descriptive information is predetermined and associated with readable device. For example, the descriptive information can include information stored by readable device 700 that uniquely identifies the device and/or a user of the device. According to this aspect, transmission component 706 can provide the predetermined descriptive information to the server in response to activation of readable device 700.

In another aspect, publication component 706 is configured to generate descriptive information associated with readable device 700 and/or a user of readable device 700 for provision to another device by the server in response to a request from the other device for information matching the current location of the readable device. Transmission component 704 can further transmit descriptive information generated by publication component 706 to the server. Publication component 706 can include information selection component 708, context component 710, and inference component 714.

Information selection component 708 is configured to receive user input regarding selection of descriptive information to associate with readable device 700 for provision to other devices. Transmission component 704 can further transmit, via a network (e.g., one of networks 106), descriptive information received by information selection component 708 to the server for association with readable device 700 and for provision to other devices. For example, information selection component 708 generate an input display that provides a user of readable device with a form that can be filled out by the user of readable device 700 with information to associate with readable device 700. The form can include various predefined fields, including fields related to the user's identity, address, contact information, family information, health information, interests, demographics, relationship status, educational history, occupation, or any other conceivable type of information that a user may want to associate (or may be required to associate) with readable device 700 and make available to other devices. In another example, selection component 708 can provide a user with a blank form that allows a user to freely choose and input information to associate with readable device. In an aspect, the information can include media and multimedia (e.g., still images, videos, animations, etc.).

In an aspect, information selection component 708 can openly receive new or updated descriptive information from a user of readable device 700 which can be provided to the server for association with readable device 700 and for provision to other devices. For example, using selection component 708, a user of readable device can occasionally, routinely, or frequently choose to update information associated with readable device 700. According to this example, a user of readable device may want to select information regarding his daily activities and interactions for association with readable device 700 and for provision to other devices. Similarly, the user may want to select information regarding his opinions and interpretations of various daily activities or information regarding how he is feeling on a certain day or afternoon.

In yet another aspect, rather than manually inputting information to associate with readable device 700 for provision to other devices, selection component 708 can receive authorization from a user of readable device 700 to import information associated with the user at various networked sources. For example, a user of readable device can authorize selection component 708 to employ information that has been associated with the user at various network based social networking communities or websites. According to this example, information selection component 108 can access the social networking sources via a network (e.g., one of networks 106) and identify information associated with the user at the social networking sources and provide this information to the server for association with readable device at the server. In another aspect, information selection component 708 can provide authorization information to the server authorizing the server to extract information associated with the user at the various social networking sources and to associate the information with the readable device 700 for provision to other devices.

In yet another aspect, publication component 706 can determine or infer descriptive information for association with readable device 700 based on various factors, including but not limited to, a context of readable device, learned or declared preferences of a user of readable device, time of day, location of readable device, health conditions of a user of reader device (e.g., where reader device is an IMD), current events, or weather conditions. According to this aspect, publication component 706 can employ context component 710 to determine or infer a context of reader device 700 and inference component 714 to facilitate in various inference based determinations based in part on context information.

Inference component 714 and context component 710 can be granted access to various types of information regarding a user of readable device stored internally (e.g., learned user preferences, user travel patterns, a user's schedule, a user's contact book, a user's cellular applications and information associated therewith), or located externally at various networked sources (e.g., social media sources) to facilitate inferring descriptive information for association with readable device. Inference component 714 and context component 710 can also employ external sources (e.g., accessible via a network) to access public information (e.g., maps, information about static entities, online encyclopedia's, information about current events, etc.) to facilitate inferring information to associated with readable device 700.

In order to provide for or aid in such inferences, inference component 714 can examine the entirety or a subset of the data to which it is granted access and can provide for reasoning about or infer states of the system, environment, etc. from a set of observations as captured via events and/or data. An inference can be employed to identify a specific context or action, or can generate a probability distribution over states, for example. The inference can be probabilistic—that is, the computation of a probability distribution over states of interest based on a consideration of data and events. An inference can also refer to techniques employed for composing higher-level events from a set of events and/or data.

Such an inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, x=(x1, x2, x3, x4, xn), to a confidence that the input belongs to a class, such as by f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Publication component can also determine or infer updates to descriptive information based on a context of readable device 700. For example, after a user has attended an event, publication component can associate information with readable device indicated that the user just attended the event and might be a good source of information about the event. In another example, readable device can be attached to a taxi cab and publication component can automatically update dynamic information associated with the taxi cab, such as information pertaining to current route, information pertaining to cost, information pertaining to availability, etc. In yet another example, readable device 700 can include a tag that is worn by runners during race. The tag can be associated with static descriptive information, such as a runner's name and race number, as well as dynamic information, such as the runners current pace, lap time, distance remaining, position among other runners, etc. Publication component 706 can update the dynamic information as it changes based on a change in context of the readable device 700.

Filter component 712 can receive filter information that restricts devices authorized to receive descriptive information associated with reader device 700. In an aspect, filter component 712 can allow a user of readable device to apply filters to all or subsets of information associated with readable device. For example, filter component can allow a user to restrict confidential information associated with readable device 700 to provision to only medical or government officials. In another example, filter component can allow a user to restrict certain information to viewing by only those devices associated with people who are known as friends or family of the user. In yet another example, filter component 512 can allow a user to restrict information associated with readable device 712 to viewing by only members of a same group as the user. Transmission component 704 can further transmit filter information to the server for association of the filter information with the readable device, and for provision of the descriptive information to the other device in response to the other device satisfying the filter information.

Figure 8:
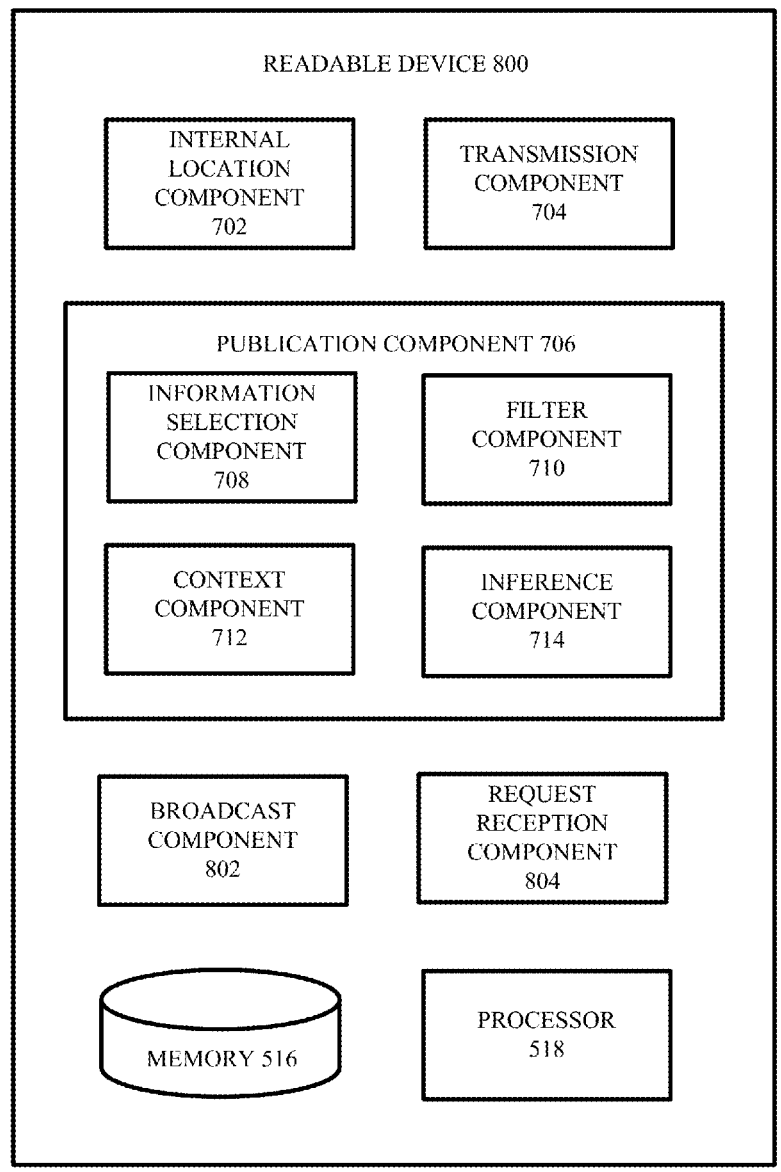
FIG. 8 presents another example readable device in accordance with various aspects and embodiments described herein.

FIG. 8 presents another example readable device 800 in accordance with aspects and embodiments described herein. Readable device 800 can include same or similar features as other reader devices previously described. Unlike reader device 700, readable device 700 is configured to interact directly with a reader device targeting readable device 800, (e.g., as opposed to communicating with a server 108). According to this embodiment, one or more components associated with readable device 700 that are also included with readable device 800 can be removed and/or have different functionality. Repetitive description of like elements employed in respective embodiments of systems, processes and devices described herein are omitted for sake of brevity.

In addition to internal location component 702, transmission component 704, and publication component 706, readable device 800 includes broadcast component 802 and request reception component 804. In an aspect, broadcast component 802 is configured to broadcast information representing a current location of readable device. For example, broadcast component 702 can transmit a beacon to surrounding reader devices indicating a current location of readable device 702, continuously, periodically or in response to movement of readable device 800. The location information can be received by a reader device and employed by a reader device to determine whether readable device 800 and/or an object or person associated with reader device 800, is an object or person being targeted by the reader device. In an aspect, broadcast component can also broadcast or transmit descriptive information associated with readable device along with the location information.

In an aspect, rather than providing descriptive information to transmission component 704 for transmission to an external sever for association with readable device at the external server, publication component 706 can provide descriptive information to transmission component and/or broadcast component 802 for transmitting or broadcasting to reader devices directly. For example, publication component 706 can identify descriptive information associated with readable device 800 and/or a user of readable device 800 for provision to another device by the readable device 800 in response to a request from the other device for information matching the current location of the readable device. Publication component can further employ transmission component 704 and/or broadcast component 802 to send the descriptive information to reader devices. In an aspect, the descriptive information is predetermined and associated with readable device. In another aspect, the publication component can 706 receive user input regarding the descriptive information and/or determine or infer the descriptive information, as discussed previously with respect to information selection component 708, context component 710 and inference component 714.

In an embodiment, rather than transmitting location and/or description information out to readable devices (where the information is not directed to any particular reader device), readable device 800 can employ request reception component 804 to listen for requests for the descriptive information associated with readable device 800. According to this aspect, request reception component 804 can activate a wireless receiver (or transceiver) of readable device 800 and listen for requests from reader devices. For example, the request reception component 804 can listen for and receive a request from a reader device. The request can identify a location of a target object and information desired that is associated with the target object.

In response to receipt of the request, request reception component 804 can determine whether readable device 800 has a current location at or substantially near (within a threshold distance away from) the location of the target object noted in the request. In response to a determination that readable device matches the location of the target object noted in the request, request reception component 804 can employ transmission component 704 to transmit the descriptive information associated with readable device 800 (and/or a subset of the description information identified in the request), back to the reader device from which the request was received.

In aspect, the in addition to information identifying a location of a target object, a request received from a reader device can also include other information identifying the target object, such as physical features of the target object, a license plate number associated with the target object, an image of the target object, etc. This other identifying information can be employed by request reception component when analyzing the request to facilitate determining whether readable device 800 is in fact the correct readable device associated with the targeted object. For example, request reception component can compare the received physical feature information with information stored in memory 717 identifying physical features of the entity which readable device 800 is associated. Based on a match between the received and stored physical features, request reception component 804 can confirm that readable device 800 is the device associated with a target object.

Figure 9:
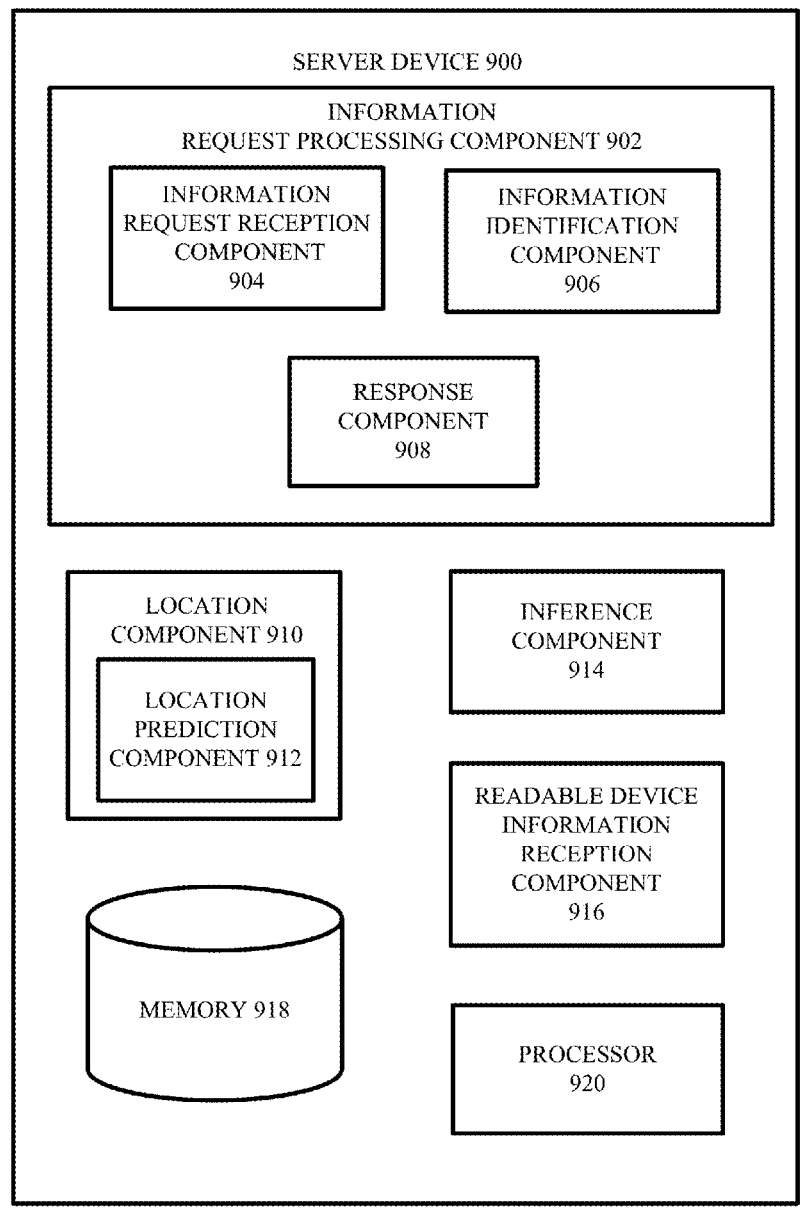
FIG. 9 presents an example server device in accordance with various aspects and embodiments described herein.

FIG. 9 presents an example server device 900 in accordance with aspects and embodiments described herein. Server device 900 can include same or similar features described in association with server 108, and vice versa. Repetitive description of like elements employed in respective embodiments of systems, processes and devices described herein are omitted for sake of brevity.

Server device includes information request processing component 902, location component 910, inference component 914, and readable device information reception component 916. Server device 900 further includes memory 918 for storing computer executable components and instructions and processor 920 to facilitate operation of the instructions (e.g., computer executable components and instructions) by server device 920. In an aspect server device 900 is situated in a core cellular network and is configured to access external sources via one or more networks (e.g., networks 106, the Internet, etc.).

In an aspect, server device 900 is configured to associate descriptive information with readable devices (e.g., in memory and/or in response to a request for the descriptive information). In an aspect, the descriptive information includes descriptive information received from respective readable devices. Information received by mobile readable devices can be received by readable device reception component 916. In another aspect, the descriptive information can include information associated with a readable device that is identified by server device 900 using various external information sources (e.g., networked databases, social networking communities, etc.). Server device 900 is also configured to associate location information with the respective readable devices that represents current locations of the readable devices. In an aspect, the location information is received from the respective readable devices at readable device information reception component 916. In another aspect, server device can employ location component 910 to determine or infer the locations of the respective readable devices (e.g., using various network based mobile device locating mechanisms).

Information request processing component 902 is configured to receive and process requests for information about a target object or person from a reader device. In an aspect, information request reception component 904 can receive such requests. A request can include information identifying a location of a target object and/or information that can be employed by location component 910 to compute a location of the target object (e.g., using vector computation and a location for the reader device as determined by location component using a network based mobile device locating mechanism). A request can also include parameters describing a subset of descriptive information associated with the target object that is desired. For example, the request can ask a specific question about the target object or ask for a category of information associated with the target object.

Information identification component 906 is configured to service a request received from a reader device and identify the requested information using information associated with the readable device that has a location matching or substantially matching the location of the target object. In an aspect, information identification component can gather the requested information using location information and descriptive information associated with the respective readable devices stored in memory. In another aspect, information identification component 906 can access various external data sources (e.g., social networking sources, phonebooks, registrars, etc.) via a network to identify the requested information.

Response component 908 is configured to return requested information to a reader device following identification by identification component. In an aspect, response component 908 can examine filters associated with a readable device that restrict devices that can receive information regarding the readable device and/or types of information about the readable device, that can be provided to certain devices. Response component 908 can further send requested descriptive information associated with a readable device back to a reader device in response to a determination that the reader device satisfies a filter associated with the readable device and/or the requested descriptive information. These filters can be received from the readable devices and associated with the respective readable devices by readable device information reception component 916.

In an aspect, in association with determining locations of respective readable devices, location component 910 can employ location prediction component 912. Location prediction component can examine historical patterns of movement of a mobile device, known route plans of the device, speed of the device, a trajectory of the device, etc., to determine a predicted location of the mobile device. The predicated location can server to confirm accuracy of location information received from the mobile device and/or substitute for missing location information associated with the mobile device (or substitute for location information associated with errors).

Server device can also include an inference component 914. Inference component 914 can employ same or similar features and functionalities as inference component 714. For example, inference component can facilitate inferring locations of mobile devices (e.g., reader devices and/or readable devices), descriptive information associated with readable device, and updates to descriptive information associated with readable devices.

In view of the example systems and/or devices described herein, example methods that can be implemented in accordance with the disclosed subject matter can be further appreciated with reference to flowcharts in FIGS. 10-14. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a method in accordance with the subject specification. It should be further appreciated that the methods disclosed throughout the subject specification are capable of being stored on an article of manufacture to facilitate transporting and transferring such methods to computers for execution by a processor or for storage in a memory.

Figure 10:
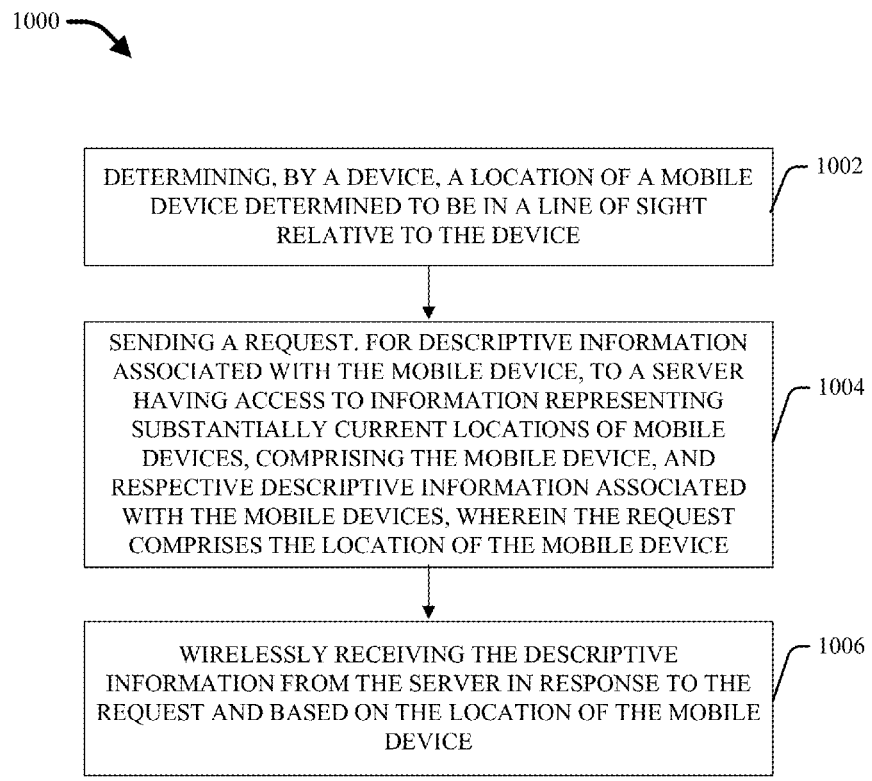
FIG. 10 presents a flow diagram of an example method for wirelessly receiving, at a mobile device, information related to another mobile device the mobile device is pointed at, in accordance with various aspects and embodiments described herein.

FIG. 10 illustrates a flow chart of an example method 1000 for wirelessly receiving, at a mobile device, information related to another mobile device the mobile device is pointed at, in accordance with various aspects and embodiments disclosed herein. At 1002, a device determines a location of a mobile device determined to be in a line of sight relative to the device. At 1004, the device sends a request for descriptive information associated with the mobile device to a server having access to information representing substantially current locations of mobile devices, comprising the mobile device, and respective descriptive information associated with the mobile devices, wherein the request comprises the location of the mobile device. At 1006, the device wirelessly receives the descriptive information from the server in response to the request and based on the location of the mobile device.

Figure 11:
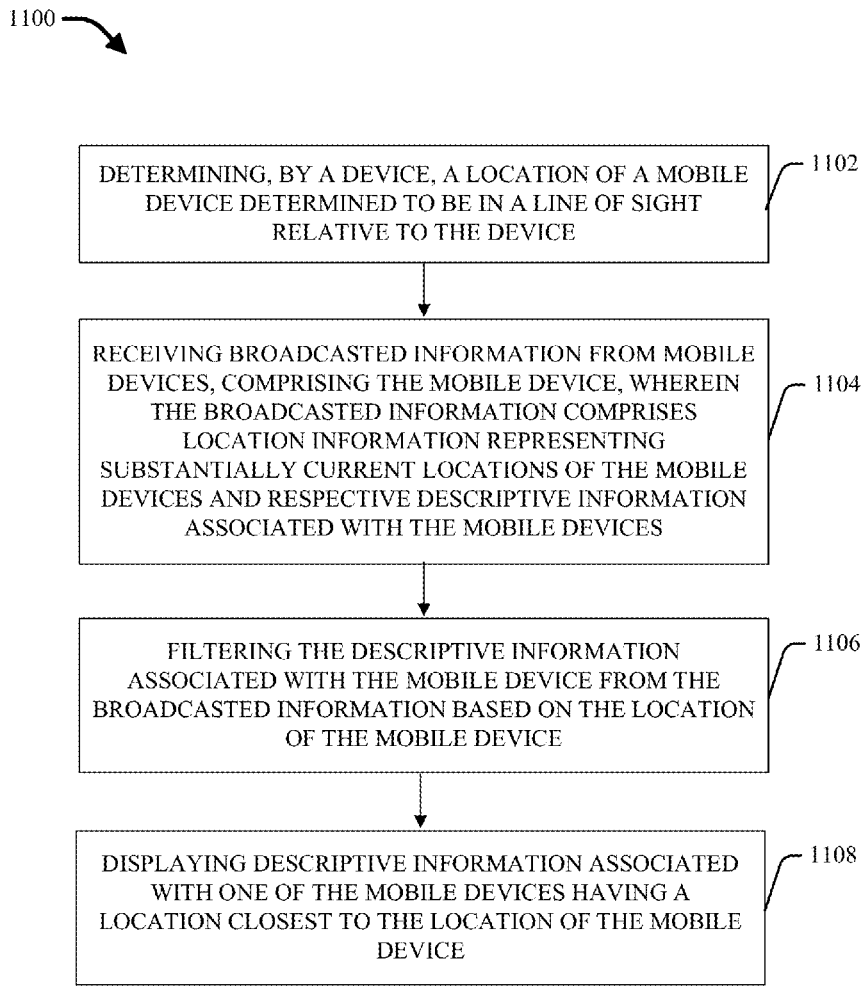
FIG. 11 presents a flow diagram of another example method for wirelessly receiving, at a mobile device, information related to another mobile device the mobile device is pointed at, in accordance with various aspects and embodiments described herein.

FIG. 11 illustrates a flow chart of another example method 1100 for wirelessly receiving, at a mobile device, information related to another mobile device the mobile device is pointed at, in accordance with various aspects and embodiments disclosed herein. At 1102, a device determines a location of a mobile device determined to be in a line of sight relative to the device. At 1104, the device receives information broadcasted from mobile devices, including the mobile device. The broadcasted information include location information representing substantially current locations of the mobile device and respective descriptive information associated with the mobile devices. At 1106, the device filters the descriptive information associated with the mobile device based on the location of the mobile device. At 1108, the device displays the descriptive information associated with one of the mobile devices having a location closest to the location of the mobile device.

Figure 12:
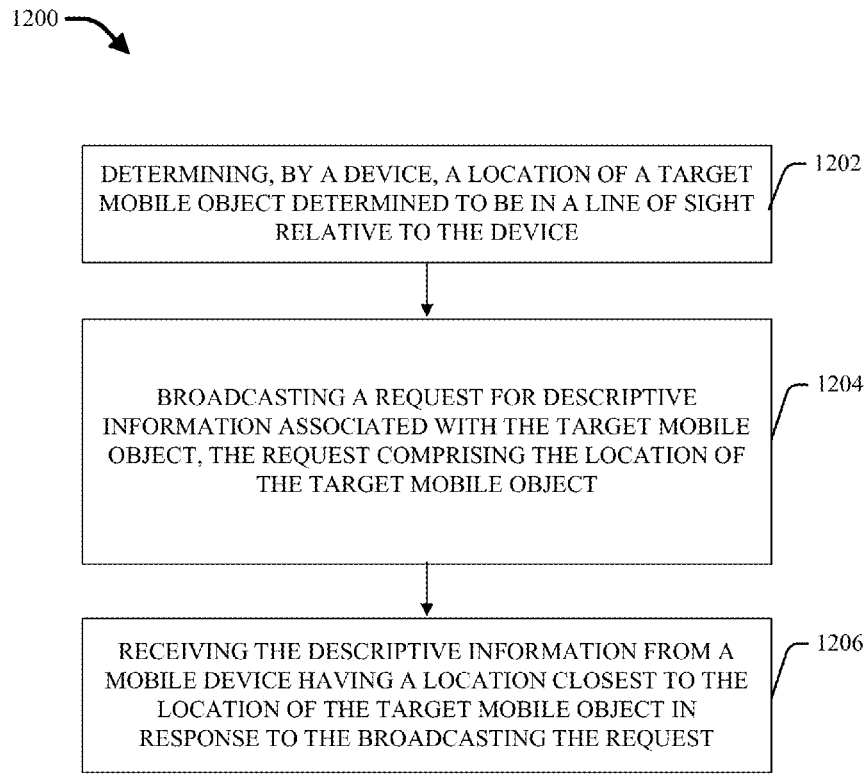
FIG. 12 presents a flow diagram of another example method for wirelessly receiving, at a mobile device, information related to another mobile device the mobile device is pointed at, in accordance with various aspects and embodiments described herein.

FIG. 12 illustrates a flow chart of another example method 1200 for wirelessly receiving, at a mobile device, information related to another mobile device the mobile device is pointed at, in accordance with various aspects and embodiments disclosed herein. At 1202, a device determines a location of a target mobile object determined to be in a line of sight relative to the device. At 1204, the device broadcasts a request for descriptive information associated with the target mobile object. The request includes information identifying the location of the target mobile object. At 1206, the descriptive information is received from a mobile device having a location closest to the location of the target mobile object in response to the request.

Figure 13:
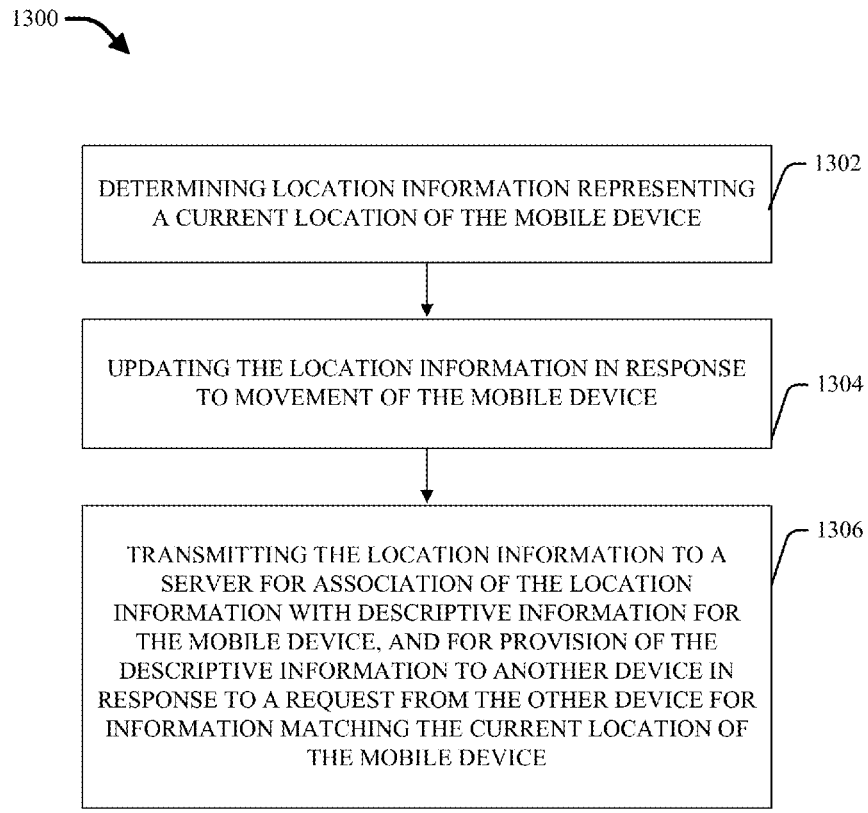
FIG. 13 presents a flow diagram of an example method for providing, by a mobile device, updated location information to a server device configured to facilitate providing descriptive information regarding the mobile device to another device targeting the mobile device, in accordance with various aspects and embodiments described herein.

FIG. 13 illustrates a flow chart of another example method 1300 for wirelessly receiving, at a mobile device, information related to another mobile device the mobile device is pointed at, in accordance with various aspects and embodiments disclosed herein. At 1302, a mobile device determines location information representing a current location of the mobile device. At 1304, the mobile device updates the location information in response to movement of the mobile device, and at 1306, the mobile device transmits the location information to a server for association of the location information with descriptive information for the mobile device, and for provision of the descriptive information to another device in response to a request from the other device for information matching the current location of the mobile device.

Figure 14:
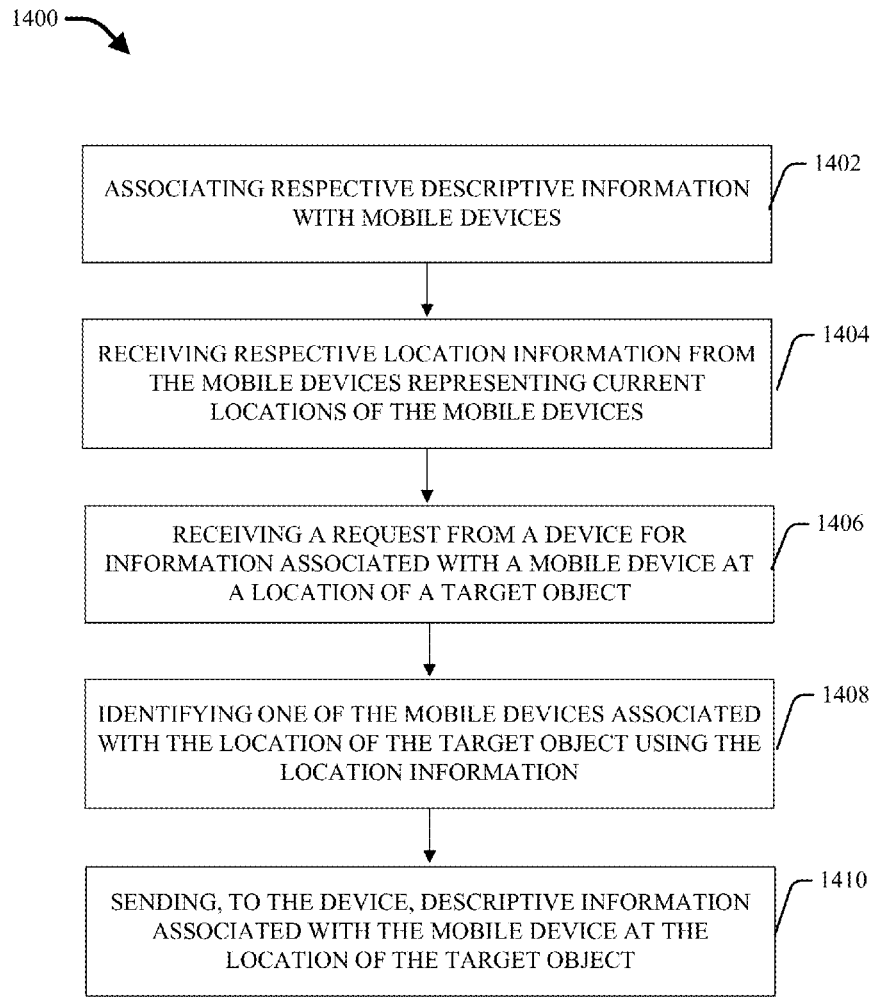
FIG. 14 presents a flow diagram of an example method for wirelessly providing, to a first mobile device, information related to another mobile device the mobile first mobile device is pointed at, in accordance with various aspects and embodiments described herein.

FIG. 14 illustrates a flow chart of another example method 1400 for wirelessly receiving, at a mobile device, information related to another mobile device the mobile device is pointed at, in accordance with various aspects and embodiments disclosed herein. At 1402, a server device associates respective descriptive information with mobile devices. At 1404, the server device receives respective location information from the mobile devices representing current locations of the mobile devices. At 1406, the server device receives a request from a device for information associated with a mobile device at a location of a target object. At 1408, the server device identifies one of the mobile devices associated with the location of the target object using the location information. At 1410, the server device sends, to the device, descriptive information associated with the mobile device at the location of the target object.

Figure 15:
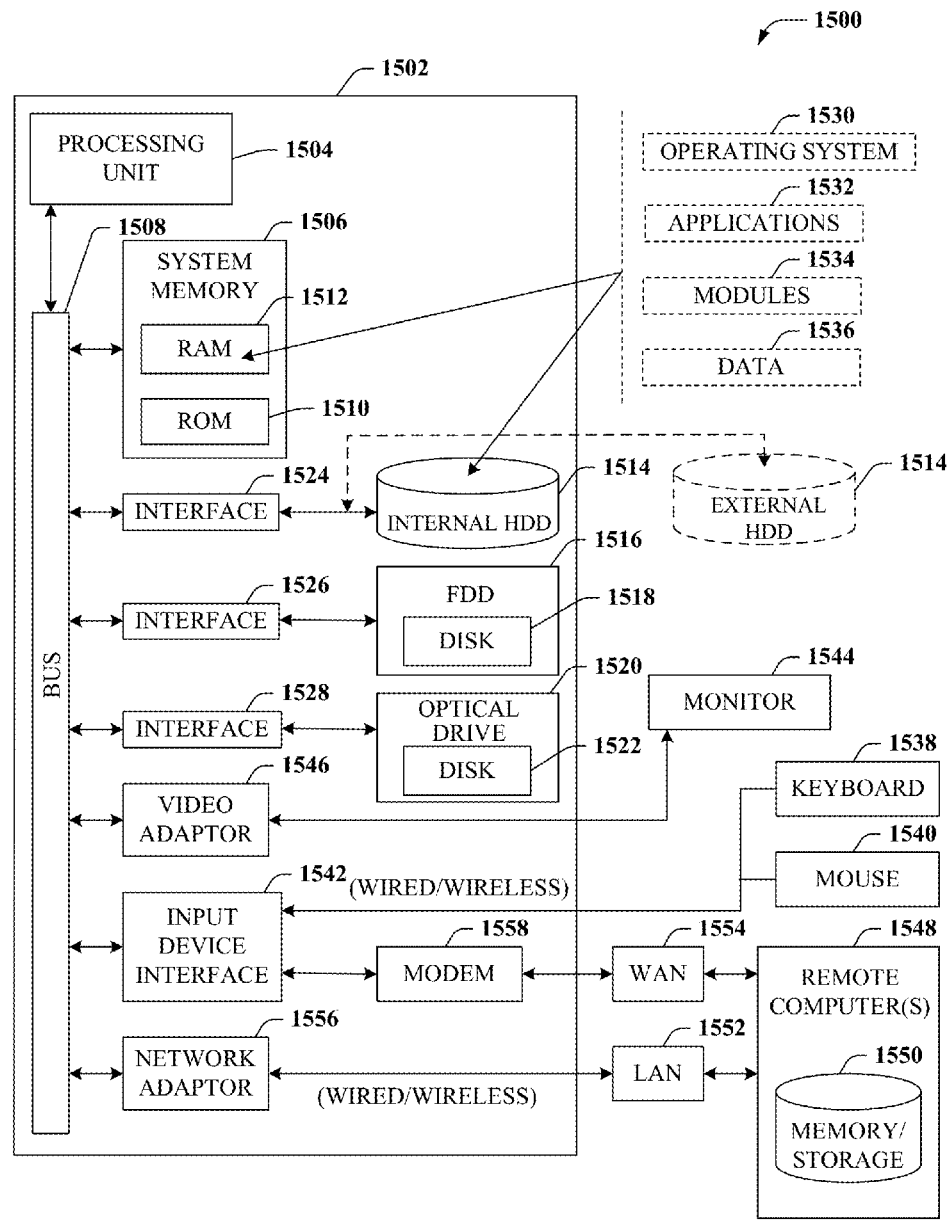
FIG. 15 is a schematic block diagram illustrating a suitable operating environment in accordance with various aspects and embodiments.
Figure 16:
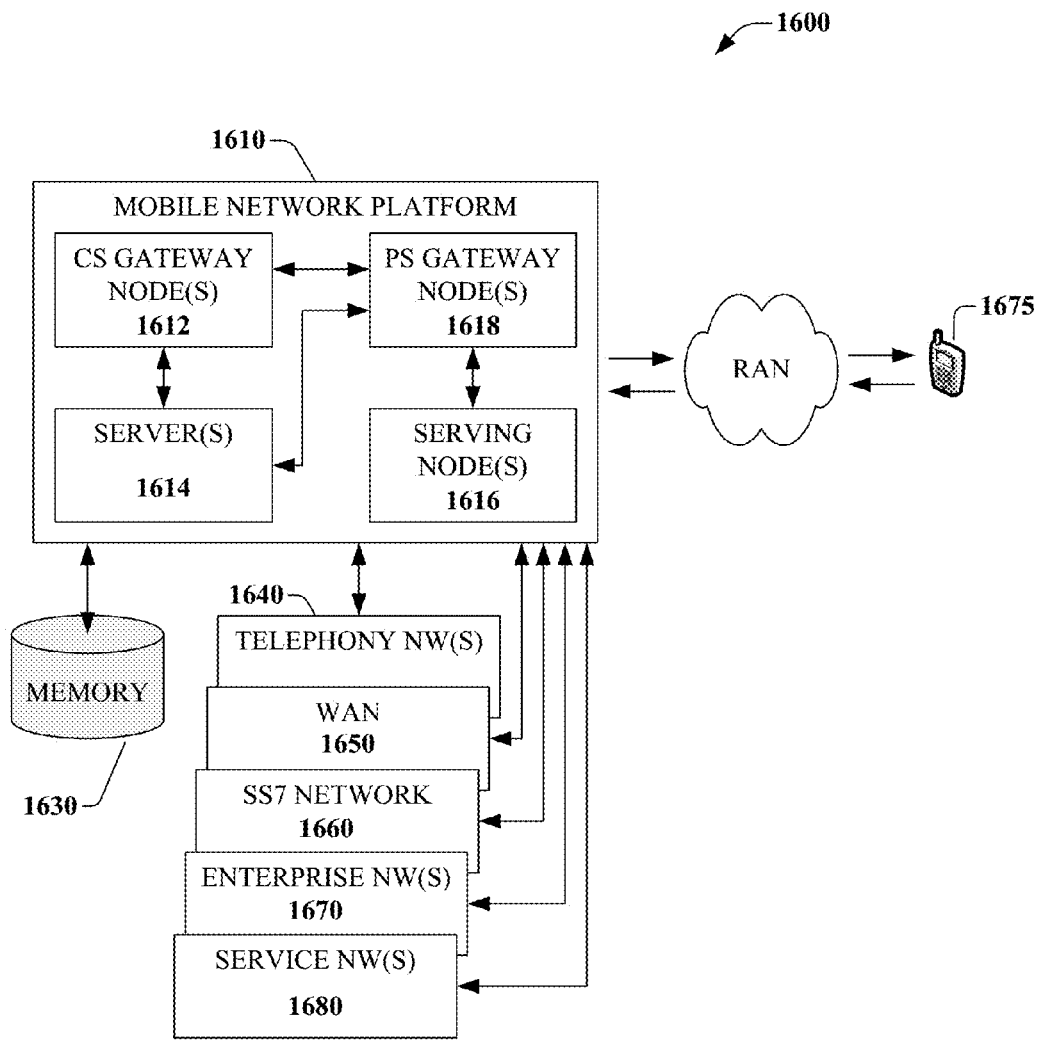
FIG. 16 is a schematic block diagram of a sample-computing environment in accordance with various aspects and embodiments.

The subject matter, FIGS. 15 and 16 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that this disclosure also can or may be implemented in combination with other program modules. Generally, program modules include routines, programs, components, data structures, etc. that performs particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., smartphone, PDA, electronic tablets or pads, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Referring now to FIG. 15, there is illustrated a block diagram of a computing environment in accordance with various aspects described herein. For example, in some embodiments, the computer can be or be included within the distributed antenna system disclosed in any of the previous systems (e.g., system 100 and 200) and devices (e.g., device 102, 104, 300, 400, 500, 600, 700, 800 and 900).

In order to provide additional context for various embodiments described herein, FIG. 15 and the following discussion are intended to provide a brief, general description of a suitable computing environment 1500 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 15, the example environment 1500 for implementing various embodiments of the aspects described herein includes a computer 1502, the computer 1502 including a processing unit 1504, a system memory 1506 and a system bus 1508. The system bus 1508 couples system components including, but not limited to, the system memory 1506 to the processing unit 1504. The processing unit 1504 can be any of various commercially available processors. Dual microprocessors and other multi-processor architectures can also be employed as the processing unit 1504.

The system bus 1508 can be any of several types of bus structure that can further interconnect to a memory bus (with or without a memory controller), a peripheral bus, and a local bus using any of a variety of commercially available bus architectures. The system memory 1506 includes ROM 1510 and RAM 1512. A basic input/output system (BIOS) can be stored in a non-volatile memory such as ROM, erasable programmable read only memory (EPROM), EEPROM, which BIOS contains the basic routines that help to transfer information between elements within the computer 1502, such as during startup. The RAM 1512 can also include a high-speed RAM such as static RAM for caching data.

The computer 1502 further includes an internal hard disk drive (HDD) 1514 (e.g., EIDE, SATA), which internal hard disk drive 1514 can also be configured for external use in a suitable chassis (not shown), a magnetic floppy disk drive (FDD) 1516, (e.g., to read from or write to a removable diskette 1518) and an optical disk drive 1520, (e.g., reading a CD-ROM disk 1522 or, to read from or write to other high capacity optical media such as the DVD). The hard disk drive 1514, magnetic disk drive 1516 and optical disk drive 1520 can be connected to the system bus 1508 by a hard disk drive interface 1524, a magnetic disk drive interface 1526 and an optical drive interface 1528, respectively. The interface 1524 for external drive implementations includes at least one or both of Universal Serial Bus (USB) and Institute of Electrical and Electronics Engineers (IEEE) 15104 interface technologies. Other external drive connection technologies are within contemplation of the embodiments described herein.

The drives and their associated computer-readable storage media provide nonvolatile storage of data, data structures, computer-executable instructions, and so forth. For the computer 1502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1512, including an operating system 1530, one or more application programs 1532, other program modules 1534 and program data 1536. All or portions of the operating system, applications, modules, and/or data can also be cached in the RAM 1512. The systems and methods described herein can be implemented utilizing various commercially available operating systems or combinations of operating systems.

A user can enter commands and information into the computer 1502 through one or more wired/wireless input devices, e.g., a keyboard 1538 and a pointing device, such as a mouse 1540. Other input devices (not shown) can include a microphone, an infrared (IR) remote control, a joystick, a game pad, a stylus pen, touch screen or the like. These and other input devices are often connected to the processing unit 1504 through an input device interface 1542 that can be coupled to the system bus 1508, but can be connected by other interfaces, such as a parallel port, an IEEE 13154 serial port, a game port, a universal serial bus (USB) port, an IR interface, etc.

A monitor 1544 or other type of display device can be also connected to the system bus 1508 via an interface, such as a video adapter 1546. In addition to the monitor 1544, a computer typically includes other peripheral output devices (not shown), such as speakers, printers, etc.

The computer 1502 can operate in a networked environment using logical connections via wired and/or wireless communications to one or more remote computers, such as a remote computer(s) 1548. The remote computer(s) 1548 can be a workstation, a server computer, a router, a personal computer, portable computer, microprocessor-based entertainment appliance, a peer device or other common network node, and typically includes many or all of the elements described relative to the computer 1502, although, for purposes of brevity, only a memory/storage device 1550 is illustrated. The logical connections depicted include wired/wireless connectivity to a local area network (LAN) 1552 and/or larger networks, e.g., a wide area network (WAN) 1554. Such LAN and WAN networking environments are commonplace in offices and companies, and facilitate enterprise-wide computer networks, such as intranets, all of which can connect to a global communications network, e.g., the Internet.

When used in a LAN networking environment, the computer 1502 can be connected to the local network 1552 through a wired and/or wireless communication network interface or adapter 1556. The adapter 1556 can facilitate wired or wireless communication to the LAN 1552, which can also include a wireless AP disposed thereon for communicating with the wireless adapter 1556.

When used in a WAN networking environment, the computer 1502 can include a modem 1558 or can be connected to a communications server on the WAN 1554 or has other means for establishing communications over the WAN 1554, such as by way of the Internet. The modem 1558, which can be internal or external and a wired or wireless device, can be connected to the system bus 1508 via the input device interface 1542. In a networked environment, program modules depicted relative to the computer 1502 or portions thereof, can be stored in the remote memory/storage device 1550. It will be appreciated that the network connections shown are example and other means of establishing a communications link between the computers can be used.

The computer 1502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 15BaseT wired Ethernet networks used in many offices.

FIG. 16 presents an example embodiment 1600 of a mobile network platform 1610 that can implement and exploit one or more aspects of the disclosed subject matter described herein. Generally, wireless network platform 1610 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1610 can be included in telecommunications carrier networks, and can be considered carrier-side components as discussed elsewhere herein. Mobile network platform 1610 includes CS gateway node(s) 1612 which can interface CS traffic received from legacy networks like telephony network(s) 1640 (e.g., public switched telephone network (PSTN), or public land mobile network (PLMN)) or a signaling system #7 (SS7) network 1670. Circuit switched gateway node(s) 1612 can authorize and authenticate traffic (e.g., voice) arising from such networks. Additionally, CS gateway node(s) 1612 can access mobility, or roaming, data generated through SS7 network 1670; for instance, mobility data stored in a visited location register (VLR), which can reside in memory 1630. Moreover, CS gateway node(s) 1612 interfaces CS-based traffic and signaling and PS gateway node(s) 1618. As an example, in a 3GPP UMTS network, CS gateway node(s) 1612 can be realized at least in part in gateway GPRS support node(s) (GGSN). It should be appreciated that functionality and specific operation of CS gateway node(s) 1612, PS gateway node(s) 1618, and serving node(s) 1616, is provided and dictated by radio technology(ies) utilized by mobile network platform 1610 for telecommunication.

In addition to receiving and processing CS-switched traffic and signaling, PS gateway node(s) 1618 can authorize and authenticate PS-based data sessions with served mobile devices. Data sessions can include traffic, or content(s), exchanged with networks external to the wireless network platform 1610, like wide area network(s) (WANs) 1650, enterprise network(s) 1670, and service network(s) 1680, which can be embodied in local area network(s) (LANs), can also be interfaced with mobile network platform 1610 through PS gateway node(s) 1618. It is to be noted that WANs 1650 and enterprise network(s) 1660 can embody, at least in part, a service network(s) like IP multimedia subsystem (IMS). Based on radio technology layer(s) available in technology resource(s) 1617, packet-switched gateway node(s) 1618 can generate packet data protocol contexts when a data session is established; other data structures that facilitate routing of packetized data also can be generated. To that end, in an aspect, PS gateway node(s) 1618 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1600, wireless network platform 1610 also includes serving node(s) 1616 that, based upon available radio technology layer(s) within technology resource(s) 1617, convey the various packetized flows of data streams received through PS gateway node(s) 1618. It is to be noted that for technology resource(s) 1617 that rely primarily on CS communication, server node(s) can deliver traffic without reliance on PS gateway node(s) 1618; for example, server node(s) can embody at least in part a mobile switching center. As an example, in a 3GPP UMTS network, serving node(s) 1616 can be embodied in serving GPRS support node(s) (SGSN).

For radio technologies that exploit packetized communication, server(s) 1614 in wireless network platform 1610 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1610. Data streams (e.g., content(s) that are part of a voice call or data session) can be conveyed to PS gateway node(s) 1618 for authorization/authentication and initiation of a data session, and to serving node(s) 1616 for communication thereafter. In addition to application server, server(s) 1614 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1610 to ensure network's operation and data integrity in addition to authorization and authentication procedures that CS gateway node(s) 1612 and PS gateway node(s) 1618 can enact. Moreover, provisioning server(s) can provision services from external network(s) like networks operated by a disparate service provider; for instance, WAN 1650 or Global Positioning System (GPS) network(s) (not shown). Provisioning server(s) can also provision coverage through networks associated to wireless network platform 1610 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1675.

It is to be noted that server(s) 1614 can include one or more processors configured to confer at least in part the functionality of macro network platform 1610. To that end, the one or more processor can execute code instructions stored in memory 1630, for example. It is should be appreciated that server(s) 1614 can include a content manager 1615, which operates in substantially the same manner as described hereinbefore.

In example embodiment 1600, memory 1630 can store information related to operation of wireless network platform 1610. Other operational information can include provisioning information of mobile devices served through wireless platform network 1610, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1630 can also store information from at least one of telephony network(s) 1640, WAN 1650, enterprise network(s) 1660, or SS7 network 1670. In an aspect, memory 1630 can be, for example, accessed as part of a data store component or as a remotely connected memory store.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory 1620 (see below), non-volatile memory 1622 (see below), disk storage 1624 (see below), and memory storage 1646 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

Memory disclosed herein can include volatile memory or nonvolatile memory or can include both volatile and non-volatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data storages, databases) of the embodiments are intended to comprise, without being limited to, these and any other suitable types of memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A mobile device, comprising:
a processor; and
a memory that stores executable instructions that, when executed by the processor, facilitate performance of operations, comprising:
determining an approximate location of a mobile object determined to be in a line of sight relative to the mobile device, wherein the approximate location is determined according to a first level of precision less than a second level of precision;
rendering identifying information that identifies the mobile object based on a first determination that the mobile object is in the line of sight relative to the mobile device;
in response to the rendering, receiving input selecting the mobile object and requesting mobile object information associated with the mobile object;
in response to the receiving the input, sending a request to a server device for the mobile object information associated with the mobile object, the request comprising location information identifying the approximate location of the mobile object and the identifying information; and
receiving the mobile object information from the server device based on a second determination that the approximate location of the mobile object corresponds to a precise location of the mobile object determined according to the second level of precision and a third determination that the identifying information corresponds to the mobile object.

2. The mobile device of claim 1, wherein the determining the approximate location of the mobile object comprises:
determining an initial location of the mobile device;
determining an orientation of the mobile device;
determining a distance between the mobile device and the mobile object; and
determining the approximate location of the mobile object based on a vector mobile device determined from the initial location of the mobile device, the orientation of the mobile device and the distance between the mobile device and the mobile object.

3. The mobile device of claim 1, wherein the operations further comprise:
receiving image information representing an image of an entity associated with the mobile object;
analyzing the image information; and
identifying a physical attribute of the entity based on the analyzing, and wherein the receiving the mobile object information associated with the mobile object is based on the attribute.

4. The mobile device of claim 1, wherein the mobile object information is variable based on a current context associated with the mobile object.

5. The mobile device of claim 1, wherein the mobile object information is variable based on a time of day.

6. The mobile device of claim 1, wherein the operations further comprise:
generating a prompt asking whether the mobile object information associated with the object is desired in association with the rendering of the identifying information, and wherein the receiving the input further comprises receiving a response to the prompt indicating the mobile object information is desired.

7. The mobile device of claim 1, wherein the operations further comprise:
determining the mobile object is in a line of sight of the mobile device based on determining that a camera of the mobile device is focused on the mobile object.

8. The mobile device of claim 7, wherein the operations further comprise:
capturing an image of the mobile object using the camera based on the determining that the camera is focused on the mobile object, and wherein the rendering of the identifying information comprises rendering the image of the mobile object.

9. The mobile device of claim 1, wherein the input comprises the mobile object information.

10. The mobile device of claim 9, wherein the request further comprises the mobile object information.

11. The mobile device of claim 1, wherein the mobile object information comprises a specified type of information requested about the mobile device, and wherein the request further comprises the mobile object information.

12. The mobile device of claim 1, wherein the second determination that the approximate location of the mobile object corresponds to the precise location of the mobile object is based on the approximate location being determined to be less than a threshold distance away from the precise location.

13. The mobile device of claim 1, wherein the mobile device comprises a wearable optics device that is worn over an eye of a user, and wherein the rendering of the identifying information comprises rendering the identifying information via a display of the wearable optics device.

14. A method, comprising:
  determining, by a mobile device comprising a processor, an approximate location of a mobile object determined to be in a line of sight relative to a position of the mobile device, wherein the approximate location is represented according to a first degree of accuracy;
  rendering, by the mobile device, identifying information that identifies the mobile object based on a first determination that the mobile object is in the line of sight relative to the mobile device;
  receiving, by the mobile device as a result of the rendering, input selecting the mobile object and requesting mobile object information associated with the mobile object;
  sending, by the mobile device, a request to a server device for the mobile object information associated with the mobile object, the request comprising location information identifying the approximate location of the mobile object and additional identifying information that identifies the mobile object other than the identifying information; and
  receiving, by the mobile device, the mobile object information from the server device based on a second determination that the approximate location of the mobile object corresponds to a precise location of the mobile object determined according to the second degree of accuracy and a third determination that the additional identifying information corresponds to the mobile object.

15. The method of claim 14, wherein the mobile object information varies based on the location of the mobile object.

16. The method of claim 14, wherein the mobile object information varies based on an activity determined to be related to a user identity associated with the mobile object.

17. A non-transitory machine-readable storage medium, comprising executable instructions that, when executed by a processor, facilitate performance of operations, comprising:
  determining, by a first device comprising the processor, an approximate location of a mobile object determined to be in a line of sight relative to the first device;
  rendering, by the first device, identifying information that identifies the mobile object based on a first determination that the mobile object is in the line of sight relative to the mobile device;
  receiving, by the first device based on the rendering, input selecting the mobile object and requesting mobile object information associated with the mobile object;
  sending, by the first device, a request to a second device for the mobile object information associated with the mobile object, the request comprising location information identifying the approximate location of the mobile object and at least one of the identifying information or additional identifying information that further identifies the mobile object; and
  receiving, by the first device from the second device, mobile object information associated with the mobile object based on a second determination that the approximate location of the mobile object corresponds to a current location of the mobile object, and a third determination that at least one of the identifying information or the additional identifying information corresponds to the mobile object.

18. The non-transitory machine-readable storage medium of claim 17, wherein the mobile object information depends on the actual location of the mobile object.

19. The non-transitory machine-readable storage medium of claim 17, wherein at least one of the identifying information or the additional identifying information comprises an image of the mobile object.

20. The non-transitory machine-readable storage medium of claim 17, wherein at least one of the identifying information or the additional identifying information comprises a visual description of the mobile object.

* * * * *